US010963281B2

(12) United States Patent
Wang et al.

(10) Patent No.: US 10,963,281 B2
(45) Date of Patent: Mar. 30, 2021

(54) NESTED VIRTUALIZATION FOR VIRTUAL MACHINE EXITS

(71) Applicant: Intel Corporation, Santa Clara, CA (US)

(72) Inventors: Kai Wang, Shanghai (CN); Bing Zhu, Shanghai (CN); Peng Zou, Shanghai (CN); Manohar Castelino, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 16/148,245

(22) Filed: Oct. 1, 2018

(65) Prior Publication Data

US 2019/0108051 A1    Apr. 11, 2019

Related U.S. Application Data

(63) Continuation of application No. 15/118,844, filed as application No. PCT/CN2015/090706 on Sep. 25, 2015, now Pat. No. 10,146,570.

(51) Int. Cl.
    *G06F 9/455*    (2018.01)
    *G06F 9/50*    (2006.01)

(52) U.S. Cl.
    CPC .......... *G06F 9/45558* (2013.01); *G06F 9/50* (2013.01); *G06F 9/5027* (2013.01);
    (Continued)

(58) Field of Classification Search
    CPC ...... G06F 9/45558; G06F 9/50; G06F 9/5027; G06F 2009/45566; G06F 2009/4557; G06F 2009/45591
    See application file for complete search history.

(56) References Cited

U.S. PATENT DOCUMENTS 8,271,978 B2    9/2012    Bennett et al.
9,753,863 B2 *  9/2017    Bachwani ............... G06F 12/10
                (Continued)

OTHER PUBLICATIONS

Burtsev, "CS5460 Operating System Lecture—Virtualization 2", Mar. 2013 (Year: 2013), 61 pages.
(Continued)

*Primary Examiner* — Lewis A Bullock, Jr.
*Assistant Examiner* — Kevin X Lu
(74) *Attorney, Agent, or Firm* — Nicholson De Vos Webster & Elliott LLP

(57) ABSTRACT

Memory security technologies are described. An example processing device includes a processor core and a memory controller coupled to the processor core and a memory. The processor core can determine that an exit condition to transfer control of a resource for a processor core from a first virtual machine monitor (VMM) to a second VMM has occurred. The processor core can also determine whether a control virtual machine control structure (VMCS) link pointer is valid. The processor core can also determine whether a reason value corresponding to the control VMCS link pointer is set. The processor core can also determine whether the reason value is set to zero. The processor core can also determining whether an exception bit corresponding to a specific exception type of a reason value is set. The processor core can also transfer a control of the resource from the first VMM to the second VMM.

20 Claims, 18 Drawing Sheets

(52) U.S. Cl.
CPC .............. *G06F 2009/4557* (2013.01); *G06F 2009/45566* (2013.01); *G06F 2009/45591* (2013.01)

(56) References Cited

U.S. PATENT DOCUMENTS

| | | | |
|---|---|---|---|
| 10,146,570 B2* | 12/2018 | Wang | .................. G06F 9/45558 |
| 2005/0060702 A1 | 3/2005 | Bennett et al. | |
| 2007/0028238 A1* | 2/2007 | Bennett | ................... G06F 9/542 |
| | | | 718/1 |
| 2009/0007103 A1* | 1/2009 | Bennett | .............. G06F 9/45558 |
| | | | 718/1 |
| 2009/0007112 A1 | 1/2009 | Moriki et al. | |
| 2009/0147014 A1 | 6/2009 | Minematsu et al. | |
| 2011/0072428 A1* | 3/2011 | Day, II | ................ G06F 9/45558 |
| | | | 718/1 |
| 2013/0007325 A1* | 1/2013 | Sahita | ..................... G06F 13/24 |
| | | | 710/267 |
| 2013/0232490 A1* | 9/2013 | Moriki | ................ G06F 9/45533 |
| | | | 718/1 |
| 2013/0326519 A1 | 12/2013 | Anderson et al. | |

OTHER PUBLICATIONS

International Preliminary Report on Patentability, PCT App. No. PCT/CN2015/090706, dated Apr. 5, 2018, 5 pages.
International Search Report and Written Opinion, PCT App. No. PCT/CN2015/090706, dated Jun. 27, 2016, 6 pages.
Notice of Allowance, U.S. Appl. No. 15/118,844, dated Jul. 11, 2018, 13 pages.

\* cited by examiner

| VMEXIT Reason 412 | VMEXIT L1 or L2 414 | Count Per Second (#/s) 416 | Percentage 418 |
|---|---|---|---|
| vmresume | L1 | 11669.8 | 28.51% |
| exception/nmi | L2 | 11425.21 | 27.92% |
| invvpid | L1 | 4920.808 | 12.02% |
| vmwrite | L1 | 3593.095 | 8.78% |
| cr access | L2 | 2723.728 | 6.66% |
| vmptrld | L1 | 1167.333 | 2.85% |
| vmxon | L1 | 1167.333 | 2.85% |
| vmclear | L1 | 1167.328 | 2.85% |
| vmxoff | L1 | 1167.328 | 2.85% |
| vmlaunch | L1 | 1034.36 | 2.53% |
| external interrupt | L2 | 524.2975 | 1.28% |
| invlpg | L2 | 110.7225 | 0.27% |
| tpr below threashold | L2 | 74.5275 | 0.18% |
| halt | L2 | 65.2775 | 0.16% |
| pending interrupt | L2 | 55.8275 | 0.14% |
| rdtsc | L2 | 33.1975 | 0.08% |
| IO | L2 | 14.1525 | 0.03% |
| pause | L2 | 11.5 | 0.03% |

| Bits 63-32 | M-1:M | 31-12 | 11-8 | 7 | 6 | 5-3 | 2 | 1 | 0 | |
|---|---|---|---|---|---|---|---|---|---|---|
| Reserved | | Address of EPT PML4 table | Rsvd. | A/D | EPT PwL-1 | EPT PS MT | | | | EPTP² |
| Ignored | Rsvd. | Address of EPT page-directory-pointer table | Ign. | A | Reserved | | X | W | R | PML4E: present |
| SVE | | Ignored | | | | | 0 | 0 | 0 | PML4E: not present |
| SVE | Ignored | Rsvd. | Physical address of 1GB page / Reserved | Ign. | D | A | 1 PAT / EPT MT | X | W | R | PDPTE: 1GB page |
| Ignored | Rsvd. | Address of EPT page directory | Ign. | A | 0 | Rsvd. | X | W | R | PDPTE: page directory |
| SVE | | Ignored | | | | | 0 | 0 | 0 | PDTPE: not present |
| SVE | Ignored | Rsvd. | Physical address of 2MB page / Reserved | Ign. | D | A | 1 PAT / EPT MT | X | W | R | PDE: 2MB page |
| Ignored | Rsvd. | Address of EPT page table | Ign. | A | 0 | Rsvd. | X | W | R | PDE: page table |
| SVE | | Ignored | | | | | 0 | 0 | 0 | PDE: not present |
| SVE | Ignored | Rsvd. | Physical address of 4KB page | Ign. | D | A | Ign. | PAT | EPT MT | X | W | R | PTE: 4KB page |
| SVE | | Ignored | | | | | 0 | 0 | 0 | PTE: not present |

FIG. 16

US 10,963,281 B2

NESTED VIRTUALIZATION FOR VIRTUAL MACHINE EXITS

RELATED APPLICATION

This application is a continuation application of U.S. patent application Ser. No. 15/118,844, filed Aug. 12, 2016, which is a national stage entry of International Application No. PCT/CN2015/090706, filed Sep. 25, 2015, each of which is incorporated by reference herein.

BACKGROUND

A computing device typically runs a single operating system (OS) that can access hardware resources of the computing device. However, virtualization allows multiple virtual machines (VMs) to be run on the computing device. A VM may be a software instantiation of a computing environment or OS. In virtualization, multiple VMs are instantiated and each VM runs its own instance of an OS. The OS of each VM may run independent of other VMs. For example, a first OS can be unaware that it is running within a VM and that other OSs are running on other VMs for the same computing device. A hypervisor or a virtual machine monitor (VMM) can virtualize hardware resources of the computing device to provide access to the hardware resources for the VMs. A set of virtualization instructions can allow the hypervisor to operate in a root mode while guest OSs and application software can run in non-root modes.

BRIEF DESCRIPTION OF THE DRAWINGS

FIG. 16 schematically illustrates example formats of paging structure entries that may be utilized by a processing system operating in accordance with one or more aspects of the present disclosure.

DESCRIPTION OF EMBODIMENTS

Figure 1:
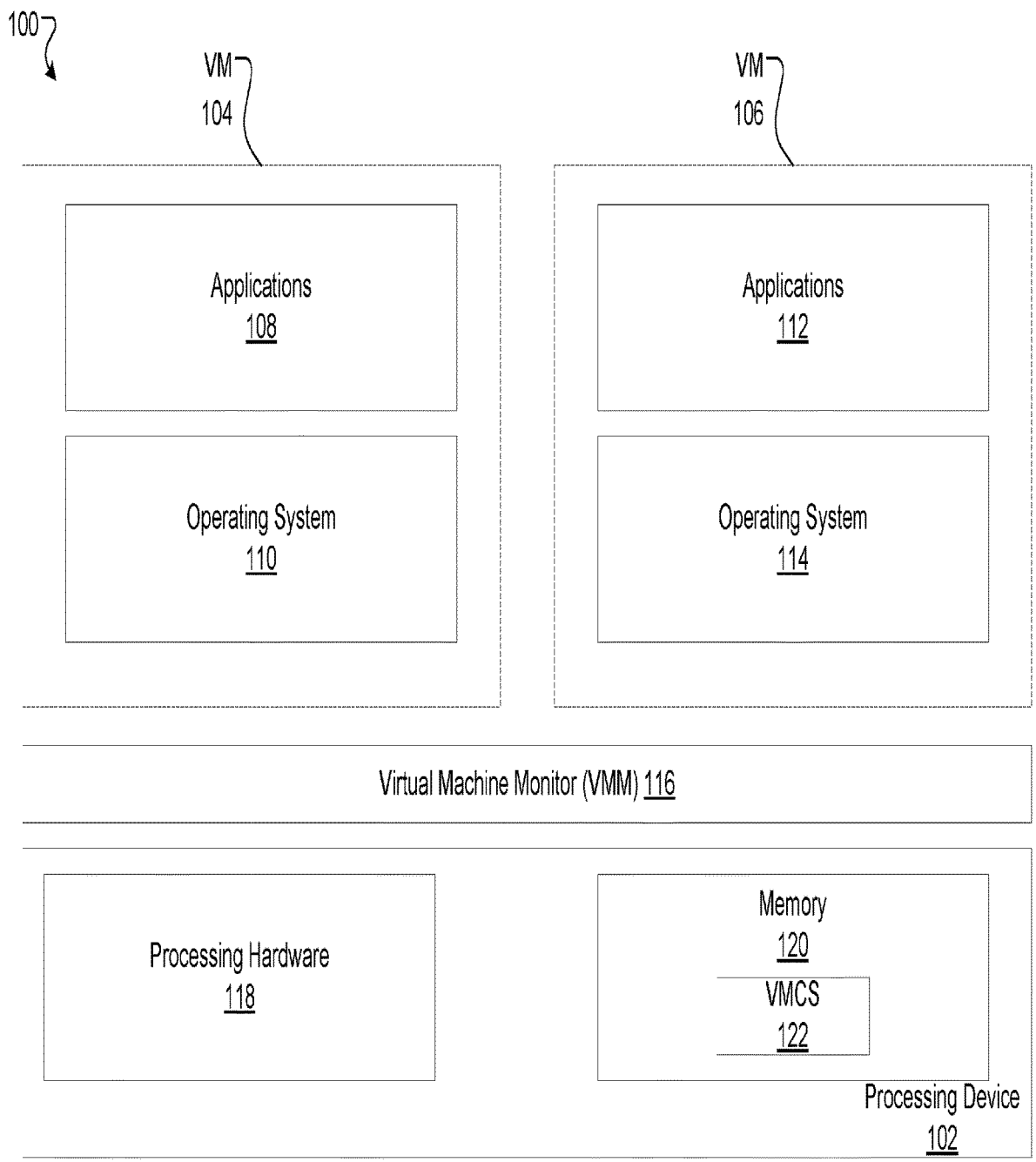
FIG. 1 illustrates a virtual machine environment for interfacing guest software to a processing device according to one embodiment.

Virtual machines (VMs) can emulate an architecture or functions of a physical computing device. For example, the VM is an operating environment that executes on computing hardware of the physical computing machine with its own operating system (OS). A VM can execute applications that run within the confines of its respective OS. Additionally, multiple VMs can be executed on the physical computing device, with each VM handling overhead associated with an execution on its own hardware. This overhead ensures the proper operation of each VM independently. A hypervisor or a virtual machine monitor (VMM) can virtualize hardware resources of the physical computing device to provide access to the hardware resources for the VMs.

Nested virtualization allows a root VMM to support guest VMMs. For example, hardware resources are virtualized to enable a root-mode VMM to efficiently run a non-root mode VMM as a guest. In one embodiment, a processing device can perform nested virtualization using a trap-and-emulate technique where hardware traps individual virtualization instructions issued by a guest VMM and a root-mode hypervisor emulates the individual virtualization instructions. However, a high frequency of virtualization instructions at critical code paths of the processing device make the trap-and-emulate technique prohibitively slow. For example, when a VMM has to exit the VM to perform address translations and return to the VM after the address translation, the exiting-and-returning task reduces performance of the processing device. In another embodiment, a processing device can perform nested virtualization using a dynamic translation technique, where privileged code sequences are translated by a guest VMM to instructions that are safely confined within a guest VM. However, the dynamic translation technique is complicated and has a highly negative performance impact on workloads of the processing device.

Execution of certain instructions at a VM may require an exit from the VM (referred to herein as a VM exit) in order to properly handle the instructions. The VM exit is a transition from a VM currently running and exercising control over resources of the computing device to a VMM of the VM exercising control over the resources. The VM exit occurs in response to certain instructions or events in the virtualization system and inflicts significant performance degradation. Conventionally, when a VM is exited in a virtualization system, a processing device will switch from a non-root mode to a root-mode. The switching from the non-root mode to the root-mode causes virtual machine extension (VMX) transitions that waste CPU cycles and increase performance overhead. For example, when a VM exit occurs, a processing device saves a snapshot of the state of the VM as it was running at the time of the exit. The VM exit may occur for instructions that handle descriptor tables. Instructions such as a load global descriptor table (LGDT) register and a load interrupt descriptor table (LIDT) require VM exits in order to properly handle the requirements associated with the instructions within the VM context. However, the processing time overhead of the VM exit is significant and reduces a performance of the VM. For example, a VM exit requires saving the processing state, recoding information about the VM exit operation, saving the current states of the descriptor tables, and so on.

Embodiments described herein address the above noted deficiencies by a virtualization system enabling a VMM in a virtual machine extension (VMX) root operation to control which VM exit can be handled by the processing device in a non-root mode directly without VMX transitions. One advantage of controlling which VM exit can be handled by the processing device in a non-root mode directly without VMX transitions is to reduce an overhead associated with the VM exit. The reduced VM exits increases efficiency by reducing virtualization latency.

FIG. 1 illustrates a virtual machine environment 100 for interfacing guest software 108, 110, 112, and 114 to a processing device 102 according to one embodiment. The processing device 102 running the virtual machine environment 100 can include hardware-assisted support for virtualization. A VMM 116 can interface VMs 104 and 106 to the processing device 102. The software running within VM 104 may include a guest OS 110 and various software applications 108. The software running within VM 106 may include a guest OS 114 and various software applications 112. The virtual machine environment 100 can use VMX instructions that allow the software programs 108 and 112 and the OSs 110 and 114 to use the same processing device and other hardware resources of processing device 102 by allocating hardware resources to the software programs 108 and 112 and the OSs 110 and 114.

To interface the VMs 104 and 106 to resources of the processor device 102, state and control information is modified and otherwise tracked via a set of fields within a virtual machine control structure (VMCS) 122. The resources of the processor device 102 can include processing hardware 118, registers, a memory 120, input/output ("I/O") resources, and so forth. The VMCS 122 can be used by the processing device 102 to pass control of and access to resources of the processor device 102 between the VMM 116 and the VMs 104 and 106.

In one embodiment, the VMM 116 can step through guest software 108-114 by setting a control field or bit in the VMCS 122. The control field or bit can be a Monitor Trap Flag (MTF). After the MTF bit is set in the VMCS 122, the VMM 116 may request a transfer of access or control of resources of the processor device 102 to the guest software 108-114. The VMM 116 may request access or control of resources of the processor device 102 by issuing an instruction.

Figure 2:
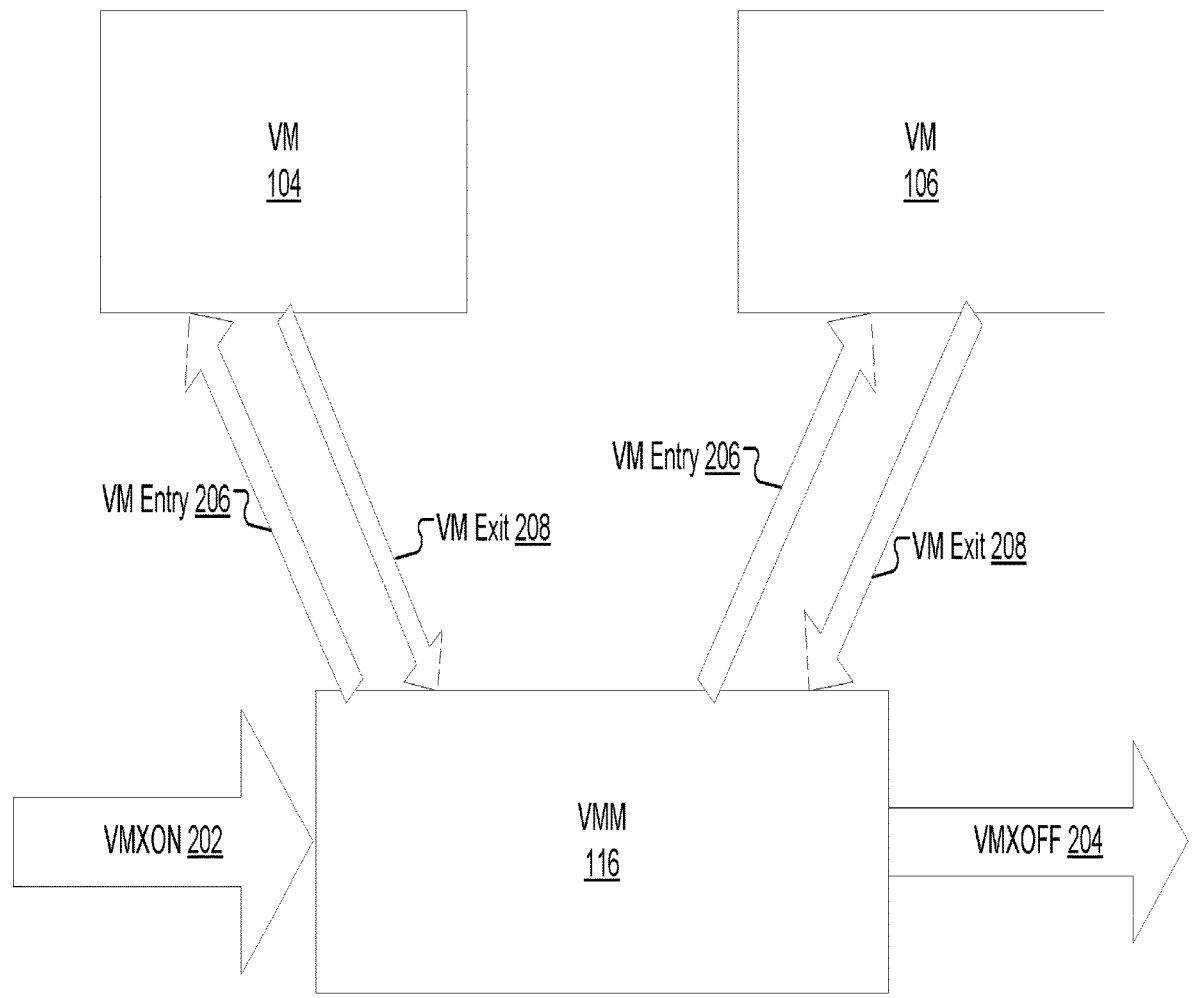
FIG. 2 illustrates virtualization instructions for a virtual machine monitor (VMM) to operate in a virtual machine environment according to one embodiment.

FIG. 2 illustrates virtualization instructions for a VMM 116 (illustrated in FIG. 1) to operate in a virtual machine environment 100 according to one embodiment. The virtualization instruction of the virtual machine environment 100 reads or writes data in a control structure used by the VMM 116 to maintain states of the VMs 104 and 106. The states of the VMs 104 and 106 can support transitions between a root mode operation of a processing device in which the VMM 116 executes and a non-root mode of the processing device in which the VMs 104 and 106 execute.

VMX instructions can be used to step through a guest software routine(s). The VMX instructions can include a VMX on instruction (VMXON) 202 that enables VMX operations for the VMM 116. For example, the VMXON 202 causes the processing device to enter VMX root operation and to use a memory referenced by the operand to support VMX operations. The VMX instructions can include a VMX off instruction (VMXOFF) 204 that disenables VMX operations for the VMM 116. For example, the VMXOFF 204 causes the processing device to shut down and leave the virtual machine environment 100.

The VMX instructions can include a VM entry event (VMENTRY) 206 that launches a VM 104 or 106 managed by the VMCS 116 (illustrated in FIG. 1) and transfers control of resources of the processing device to the VM 104 or 106. In one example, the VMENTRY 206 can be a VM launch event (VMLAUNCH) to launch a virtual machine managed by the VMCS 116. In another example, the VMENTRY 206 can be a VM resume event (VMRESUME) to resume a VM managed by the VMCS 116. For example, software of a processing device enters a VMX operation by executing a VMXON. Using VM entries, the VMM 116 can transfer resource or processor control to VMs 104 or 106. For example, the VMLAUNCH can be executed in order to execute a guest application of VM 104 for the first time. The VMRESUME may be used to perform the same function after the initial launch.

The VMX instructions can include a VMEXIT event (VMEXIT) 208 that transfers control of resources of the processing device from the VM 104 or 106 to the VMM 116. The VMEXIT 208 can be any event that causes the processing device to stop execution of the VM 104 or 106 and returns control to the VMM 116. The events can include faults, exceptions, interrupts, memory accesses, control register accesses, special virtualization instructions, and so forth. For example, the VMX instructions can be susceptible to failure when an event, such as an exception, occurs during the execution of the guest software. When a failure occurs, the VMEXIT 208 can be issued by the processing device to return control of resources of the processing device from the VM 104 or 106 to the VMM 116. In another example, upon successful execution of all the instructions for a routine within an application 108 or 112 (illustrated in FIG. 1) of VM 104 or 106, a VMEXIT event can occur and control of resources of the processing device is returned from the VM 104 or 106 to the VMM 116. In one example, the VMEXIT event can occur when the VMM 116 receiving a request by a VM handler of the processing device.

In one embodiment, a "natural" VMEXIT can be an event that causes a VMEXIT 208 that is not an explicit VMEXIT 208 from software running in the VM 104 or 106. For example, the natural VMEXIT is a VMEXIT 208 that is not caused by an instruction intended specifically to cause an exit of VM 104 or 106. In one example, the VMEXIT 208 transfers control to an entry point specified by the VMM 116. The VMEXIT 208 can be a VMX transitioning instruction for transitioning from a non-root mode to a root-mode.

The VMX instructions can also include: a VMPTRLD instruction; a VMPTRST instruction; a VMCLEAR instruction; a VMREAD instruction; a VMWRITE instruction; and a VMCALL instruction.

Figure 3:
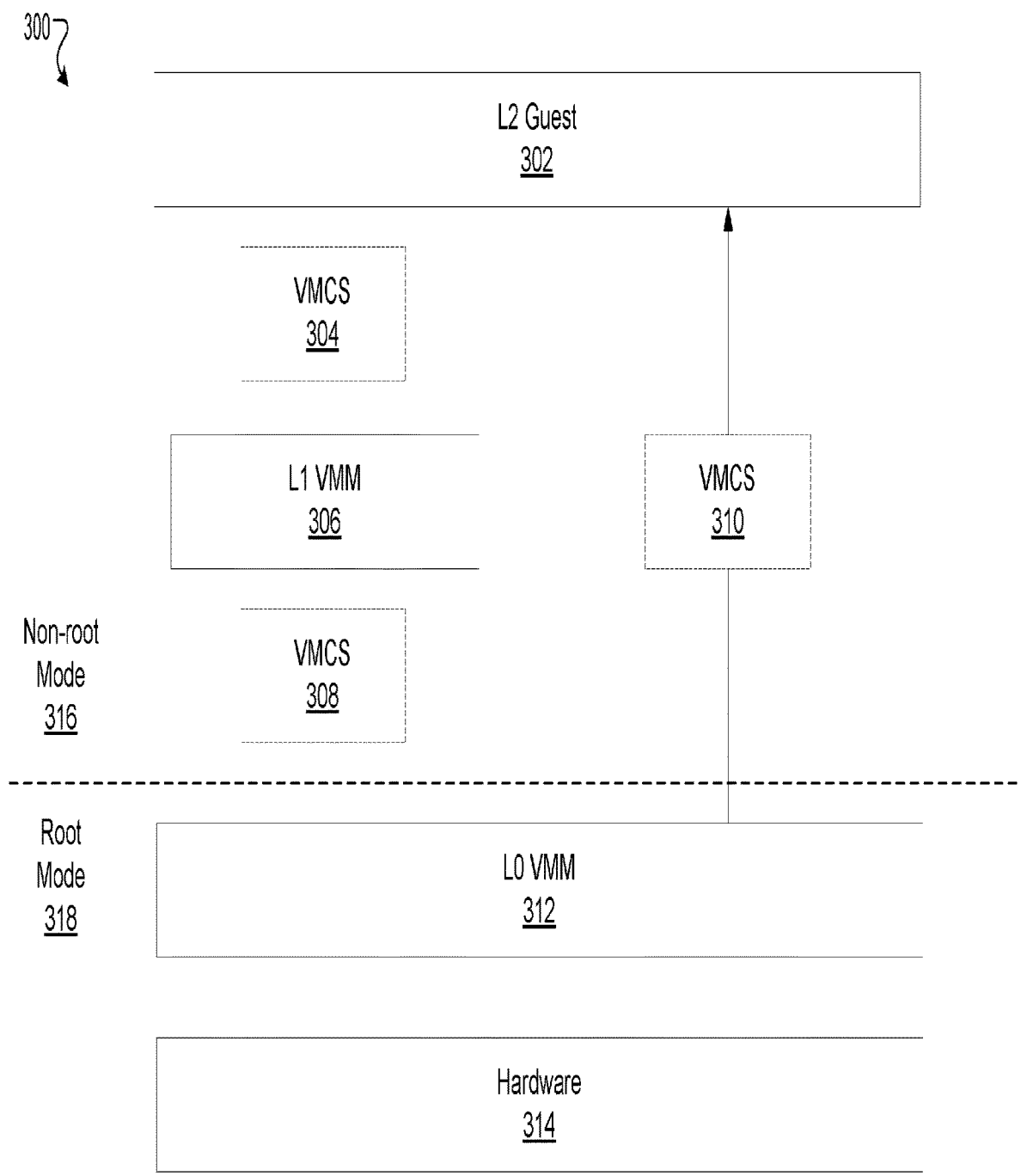
FIG. 3 shows a nested virtualization technology (VT) system according to one embodiment.

FIG. 3 shows a nested virtualization technology (VT) system 300 according to one embodiment. The nested VT architecture 300 can includes: a level 2 (L2) guest 302, a VMCS 304, a level 1 (L1) VMM 306, a VMCS 308, a VMCS 310, a level 0 (L0) VMM 312, and hardware 314. In one example, the hardware 314 can be hardware of a processing device 102, such as a processor, random access memory (RAM), and so forth. In another example, the hardware 314 can be hardware coupled to the processing device 102 (illustrated in FIG. 1).

Virtualization for a virtual machine environment 100 (illustrated in FIG. 1) can include two modes to run under virtualization: a root mode 318 and a non-root mode 316. The L0 VMM 312 is a VMM running in the root mode 318. The L1 VMM 306 is a VMM running on top of the L0 VMM 312 in the non-root mode 316. In one embodiment, the L1 VMM 306 runs in the non-root mode 316 as virtualization controlling software. Non-root operations can be controlled by the L1 VMM 306. For example, operations in the L2 guest 302 can be controlled by the L1 VMM 306 Non-root operations can include VMENTRY events and VMEXIT events.

In another embodiment, the L1 VMM 306 runs as a guest of L0 VMM 312. The L2 guest 302 is guest software, including applications 108 and 112 and OSs 110 and 114 (illustrated in FIG. 1), that runs on top of the L1 VMM 306. For example, the guest software can be an OS such as Window®, Linux®, or Unix®. The VMCS 308 is created and used by the L0 VMM 312 to run L1 VMM 306 or the L2 guest 302. The VMCS 304 is created and used by L1 VMM 306 to run the L2 guest 302. In another example, the VMCS 304 is used by the L1 VMM 306 as memory storage. In this example, the VMCS 304 may not be loaded by a VMPTRLD instruction. VMCS 310 is a VMCS merged by L0 VMM 312 to run the L2 guest 302. To VMCS 310 can be merged by the L0 VMM 312 merging the data from the VMCS 308 and the VMCS 304 into the VMCS 310. The VMCS 310 can launch the L2 guest 302 using the VMCS 310. In another embodiment, the VMCS 310 can launch the L1 VMM 306 and the L1 VMM 306 can launch the L2 guest 302. When the L1 VMM 306 is to launch the L2 guest 302, the L1 VMM 306 can call a VMRESUME. In this embodiment, the L0 VMM 312 can intercept the VMRESUME. When the L0 VMM 312 intercepts the VMRESUME, the L0 VMM 312 can update data at the VMCS 310 from data at the VMCS 304 and the VMCS 308 and then launch the L2 guest 302 on behalf of the L1 VMM 306.

In another embodiment, when a VMEXIT event occurs at the L2, the VMEXIT event causes a processing device to switch from a non-root mode for executing guest software to root mode. The control of hardware resources of the processing device can be handled directly by the L0 VMM 312. In one example, the VMEXIT event for switching hardware resource control from the L2 guest 302 to L0 VMM can include: switching the current VMCS of the nested VT architecture 300 from VMCS 310 to VMCS 308; copying a guest field of VMCS 310 to a guest field of VMCS 304; copying VMEXIT fields of VMCS 310 to VMEXIT fields VMCS 304; copying host fields of VMCS 304 to guest fields of VMCS 308; and calling a VMRESUME event to switch back to the non-root mode. In this example, when the guest fields of VMCS 308 are copied from the host fields of VMCS 304, a VMEXIT handler of the L1 VMM 306 will be executed as if the VMEXIT event occurred received from L2 guest 302.

Figures 4A, 4B:
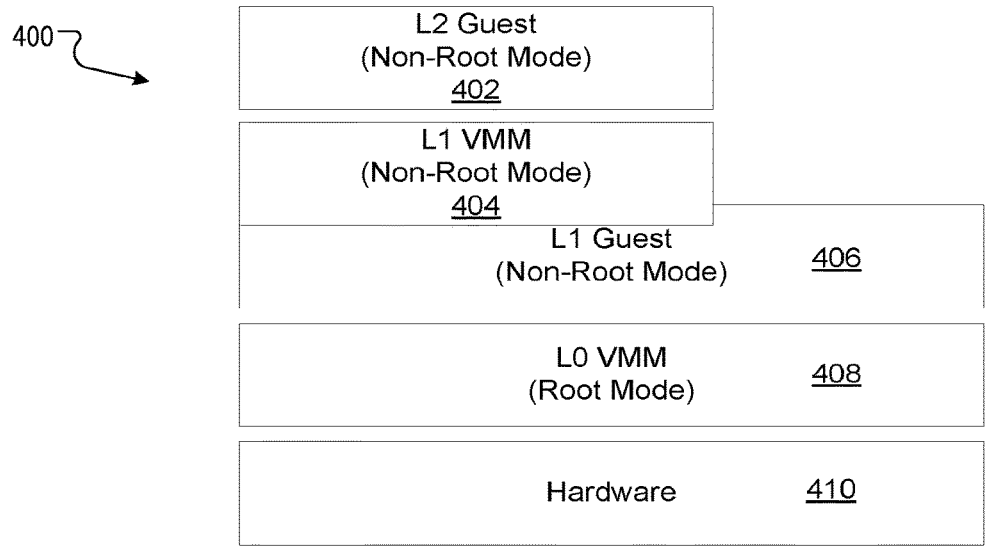
FIG. 4A illustrates a configuration of a VT system according to one embodiment.
FIG. 4B illustrates a table of virtual machine (VM) exit events executed by the VT architecture for different data in a nested VT environment according to one embodiment.

FIG. 4A illustrates a configuration of a VT system 300 (illustrated in FIG. 3) according to one embodiment. The VT architecture 300 includes: an L2 guest 402 that operates in a non-root mode, such as a Windows® operating system; a L1 VMM 404 that operates in a non-root mode, such as a VMWare® VMM or hypervisor; a L1 guest 406 that operates in a non-root mode, such as a Windows® operating system; a L0 VMM with nested support that operates in a root mode, such as an Intel® kernel guard technology (IKGT); and hardware of a processing device, such as a processor, random access memory (RAM), and so forth.

FIG. 4B illustrates a table of VMEXIT event triggered by the VT architecture 300 (illustrated in FIG. 4A) for different data in a nested VT environment according to one embodiment. The table 420 includes: a VMEXIT reason column 412 indicating causes of VMEXITs being issued; a VMEXIT L1 or L2 column 414 indicating whether the VMEXITs is issued from the L2 guest 402, the L1 guest 406, or the L1 VMM 404 (illustrated in FIG. 4A); a count per second (#/s) column 416 indicating a number of VMEXITs that occur per second for the respective VMEXIT reason of the L2 guest 402 or the L1 guest 406; and a percentage column 418 that indicates a percentage of the VMEXIT events for the different VMEXIT events from a total percentage of VMEXIT reasons for the L2 guest 402 and the L1 guest 406. In one example, a total percentage of the VMEXIT events that are sent from L2 guest 402 is 36.74% and the total percentage of the VMEXIT events that are sent from L1 guest 406 is 63.26%.

Figure 5A:
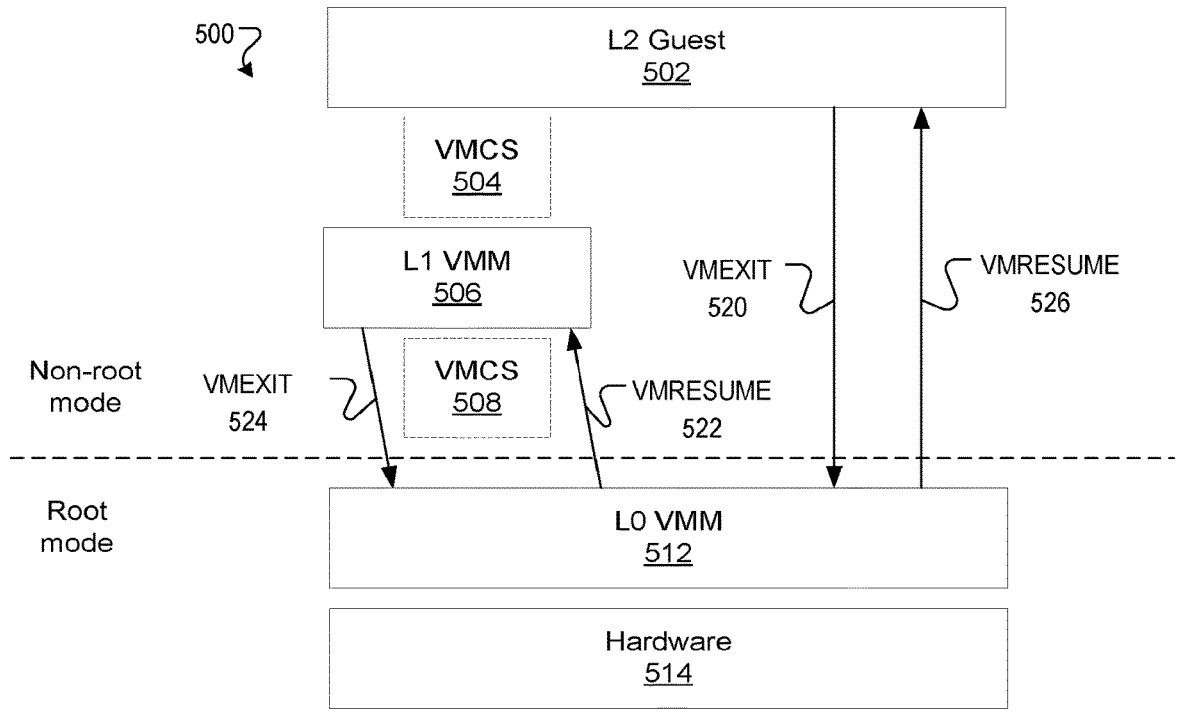
FIG. 5A illustrates a VM exit relay between VMMs executed in a VT system according to one embodiment.

FIG. 5A illustrates a VMEXIT that is relayed through L0 VMM 512 to L1 VMM 506 executed in a VT system 500 according to one embodiment. In one example, a when VMEXIT event 520 occurs for L2 guest 502, L0 VMM 512 can be invoked to control the resources allotted for the L2 guest 502. In this example, when L0 VMM 512 is invoked, the L0 VMM 512 can relay control of the resources to L1 VMM 506 using a VMENTRY 522 to simulate a VMEXIT event to L1 VMM 506. When L1 VMM 506 is finished handling this VMEXIT, the L1 VMM 506 can send a VMEXIT 524 to L0 VMM 512. L0 VMM 502 can relay control of the resources to L2 guest 502 using the VMRESUME 526. When the VMRESUME to L2 guest 502, the control of hardware 514 can be controlled to continue execution.

Figure 5B:
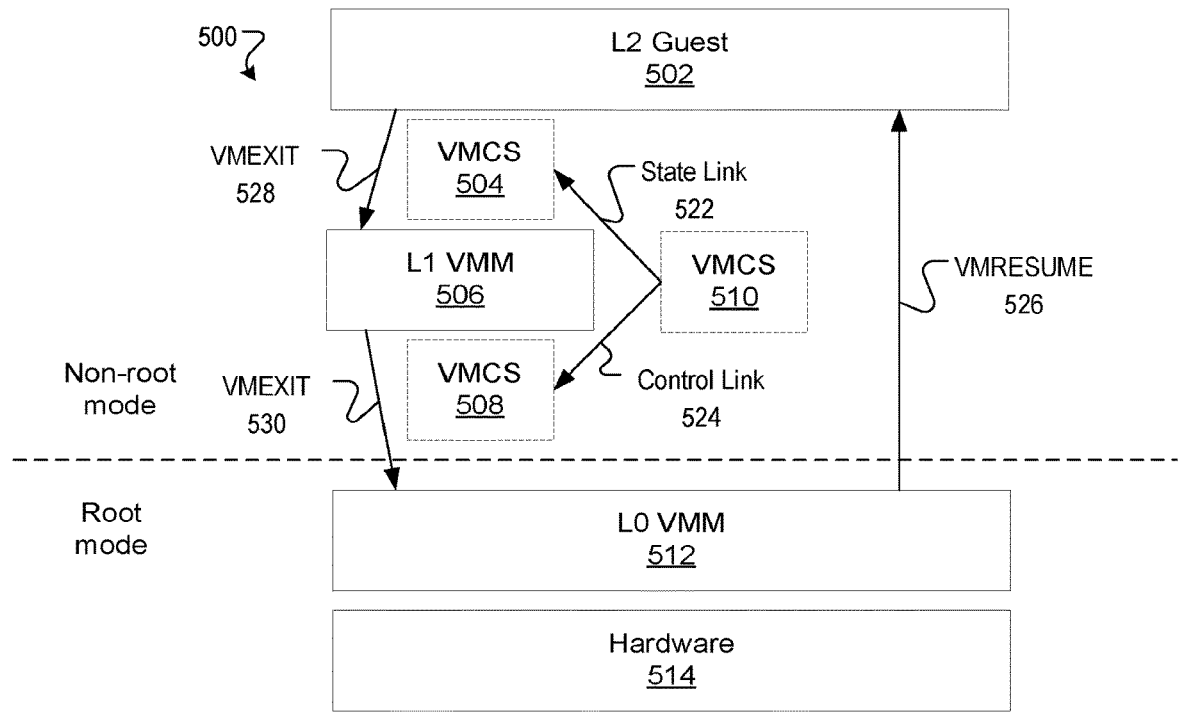
FIG. 5B illustrates a VM exit executed directly by a VMM in the VT system according to one embodiment.

FIG. 5B illustrates a VMEXIT triggered directly by L1 VMM 506 in the VT system 500 according to one embodiment. In one example, when a VMEXIT event 520 occurs for L2 guest 502, L1 VMM 506 can be invoked to control the resources allotted for the L2 guest 502. In this example, when L0 VMM 512 is be invoked, the L0 VMM 512 can switch control of the resources directly to L1 VMM 506 using a VMEXIT 528. When L1 VMM 506 is finished handling this VMEXIT, the L1 VMM 506 can send a VMRESUME 530 to L0 VMM 512 and then L0 VMM 502 relay control of the resources to L2 guest 502 using the VMRESUME 526. When the VMRESUME 526 is sent to L2 guest 502, the control of hardware 514 can be controlled by L2 guest 502 to continue execution of an application or OS of L2 guest 502. One advantage of the VMEXIT directly executed in the VT system 500 is to reduce a VMX transition time for VMEXITs in the VT system 500 by reducing the number of VMEXITS and VMRESUMES used to transfer control of the resources.

Figure 6:
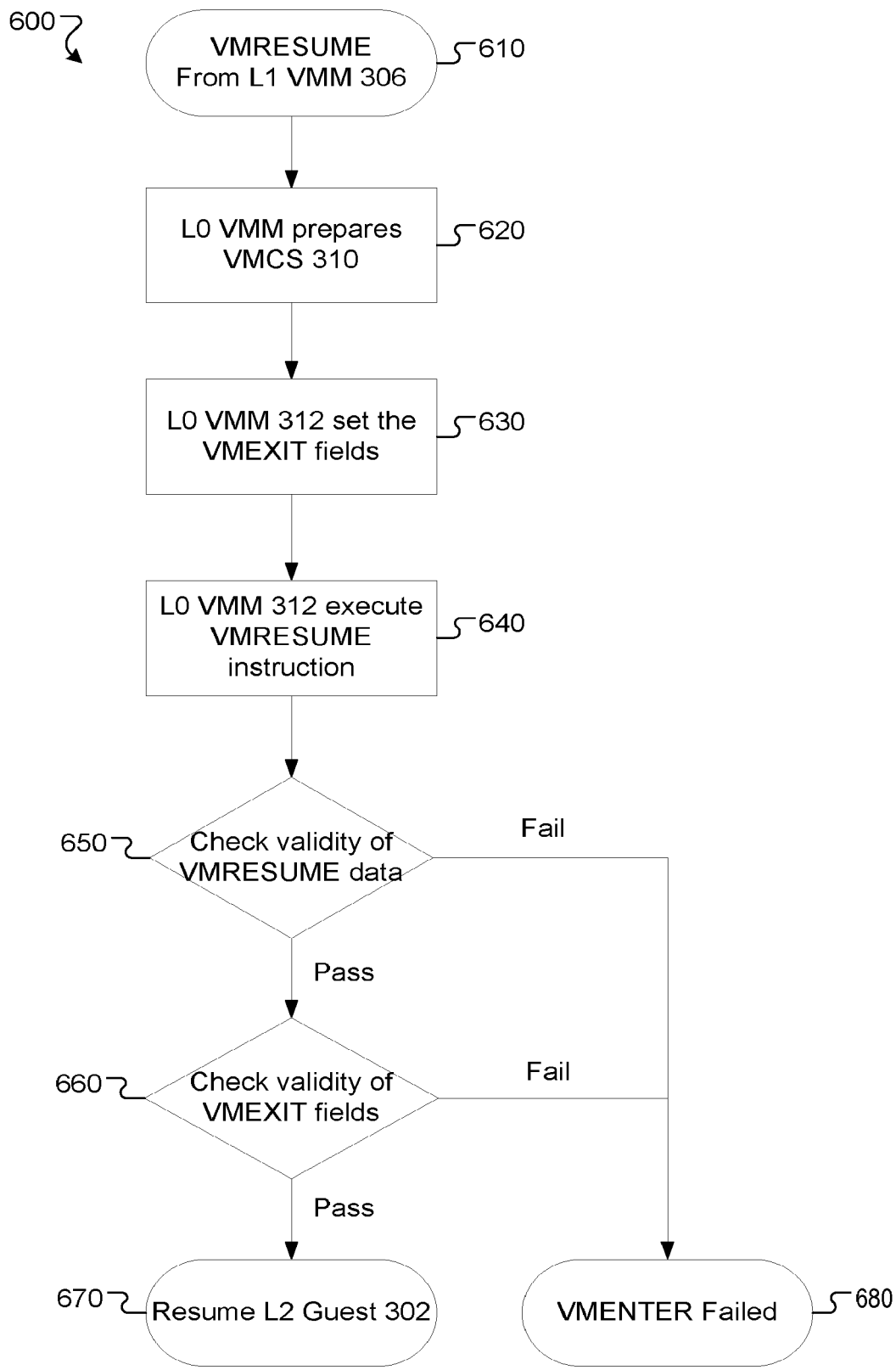
FIG. 6 illustrates depicts a flow diagram of a method to transfer resource control from a level 1 (L1) L1 VMM to a level 2 (L2) guest according to one embodiment.

FIG. 6 illustrates depicts a flow diagram of a method 600 to transfer resource control from the L1 VMM 306 to the L2 guest 302 to (illustrated in FIG. 3) according to one embodiment. Method 600 may be performed by a computer system or a software library (such as a runtime library) executed by a processor of the computing system. Method 600 and/or each of its functions, routines, subroutines, or operations may be performed by one or more physical processors of the computer system executing the method. Two or more functions, routines, subroutines, or operations of method 600 may be performed in parallel or in an order that may differ from the order described above. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other.

Referring to FIG. 6, the method 600 may begin with a processor or software library (such as a runtime library) executed by the processor receiving a VMRESUME event at the L1 VMM 306 (illustrated in FIG. 3) to transfer a control of hardware resources to the L2 guest 302 (610). The method can include preparing, by L0 VMM 312, the VMCS 310 to transfer resource control to the L2 guest 302 (620). In one example, the L0 VMM 312 can prepare the VMCS 310 by setting the data fields of the current VMCS 310 for L2 guest 302 as discussed in greater detail in the proceeding paragraphs for FIG. 7.

The method can include setting, by L0 VMM 312, VMEXIT field when the VMCS02 has been prepared (630). For example, the VMEXIT field can be set with: a Control VMCS link pointer having the address of VMCS 308; a state VMCS link pointer having the address of VMCS 304; and a reason bitmap. In one example, the reason bitmap can have a memory address which points to 128 bits. In another example, the value of the 128 bits can be 0x0FFFFFFF_FFFFFFFD, which indicates that L0 VMM 312 may only handle: external interrupts or unknown reason. In another example, a non-maskable interrupt (NMI) VMEXIT may be delivered through a VMEXIT exception reason. In this example, the VMEXIT exception reason can also indicate exceptions from a guest OS of L2 Guest 302. In one embodiment, when L0 VMM 312 is to designate L1 VMM 306 to handle a transfer of resource control from L2 guest 302 directly, a reason bit for the NMI VMEXIT reason is set to one. In another embodiment, when the L0 VMM 312 is to handle the transfer of resource control from the L2 guest 302, the NMI VMEXIT reason value is set to zero. The VMEXIT field can also be set with a VMEXIT exception bitmap that is set to 0xFFFFFFFB. The VMEXIT field that is set to 0xFFFFFFFB indicates that only a NMI VMEXIT from L2 guest 302 will trigger an transfer of resource control to L0 VMM and exceptions will trigger a transfer of resource control to L1 VMM 306. For example, the VMEXIT reason 420 (illustrated in FIG. 4B) for NMI is zero. In this example, besides the VMEXIT reason 420 for NMI, a zero for the VMEXIT reason 420 can be a VMEXIT from an exception, such as page fault. When the VMEXIT reasons 420 are zero the VMEXIT is handled by L0 VMM 512 (illustrated in FIG. 5A). Additionally, for VMEXIT reasons 420 that are non-zero, when a corresponding bit in reason bitmap 714 (illustrated in FIG. 7) is set, the VMEXIT will be handled by L1 VMM 506 (illustrated in FIG. 5A).

In one embodiment, when the zero bit position in reason bitmap 714 is zero, the VMEXIT is handled by L0 VMM 512. In another embodiment, when the zero bit position in reason bitmap 714 is one, the exception bitmap 716 (illustrated in FIG. 7) is checked. When the exception ID NMI at bit position 2 of the exception bitmap 716 is two, the VMEXIT is handled by L1 VMM 506. When the exception ID NMI at bit position 2 of the exception bitmap 716 is not two, the VMEXIT is handled by L0 VMM 512. In this example, when the NMI VMEXIT from L2 guest 302 is handled by L1 VMM 506 when both bit 0 in reason bitmap 714 and bit 2 in exception bitmap 716 are set to zero.

The method can include executing, by the L0 VMM 312, a VMRESUME (640). The method can include checking, by the processor or software library, a validity of VMRESUME data associated with the VMRESUME (650). In one example, the VMRESUME data is valid when fields 710, 712, and 714 (illustrated in FIG. 7) are not equal to 0xFFFFFFFF_FFFFFFFF and are invalid when fields 710, 712, and 714 are equal to 0xFFFFFFFF_FFFFFFFF. When the VMRESUME data check fails, the VMRESUME fails and the VMRESUME event is not triggered and the resource control remains at L0 VMM 312 (680). When the VMRESUME data check passes, the processor or software library can check the validity of the VMEXIT fields (660). For example, during the triggering of the VMRESUME event, the processor can check whether the state VMCS link pointer, the control VMCS link pointer, the reason bitmap, and the exception bitmap are each valid or invalid. In one example, when the state VMCS link pointer, the control VMCS link pointer, the reason bitmap, and the exception bitmap are each valid, the VMRESUME was successful and resource control is transferred to L2 guest 302. In another example, when the state VMCS link pointer, the control VMCS link pointer, and the reason bitmap, and the exception bitmap are each invalid, L0 VMM 312 is to handle the exceptions. When at least one of the state VMCS link pointer, the control VMCS link pointer 712, the reason bitmap 714, and the VMEXIT exception bitmap 616 is valid and at least one of them is invalid, the integrity check for the VMRESUME fails (680). When the VMEXIT fields pass, the resource control can be switched to the L2 guest 302 (670).

Figure 7:
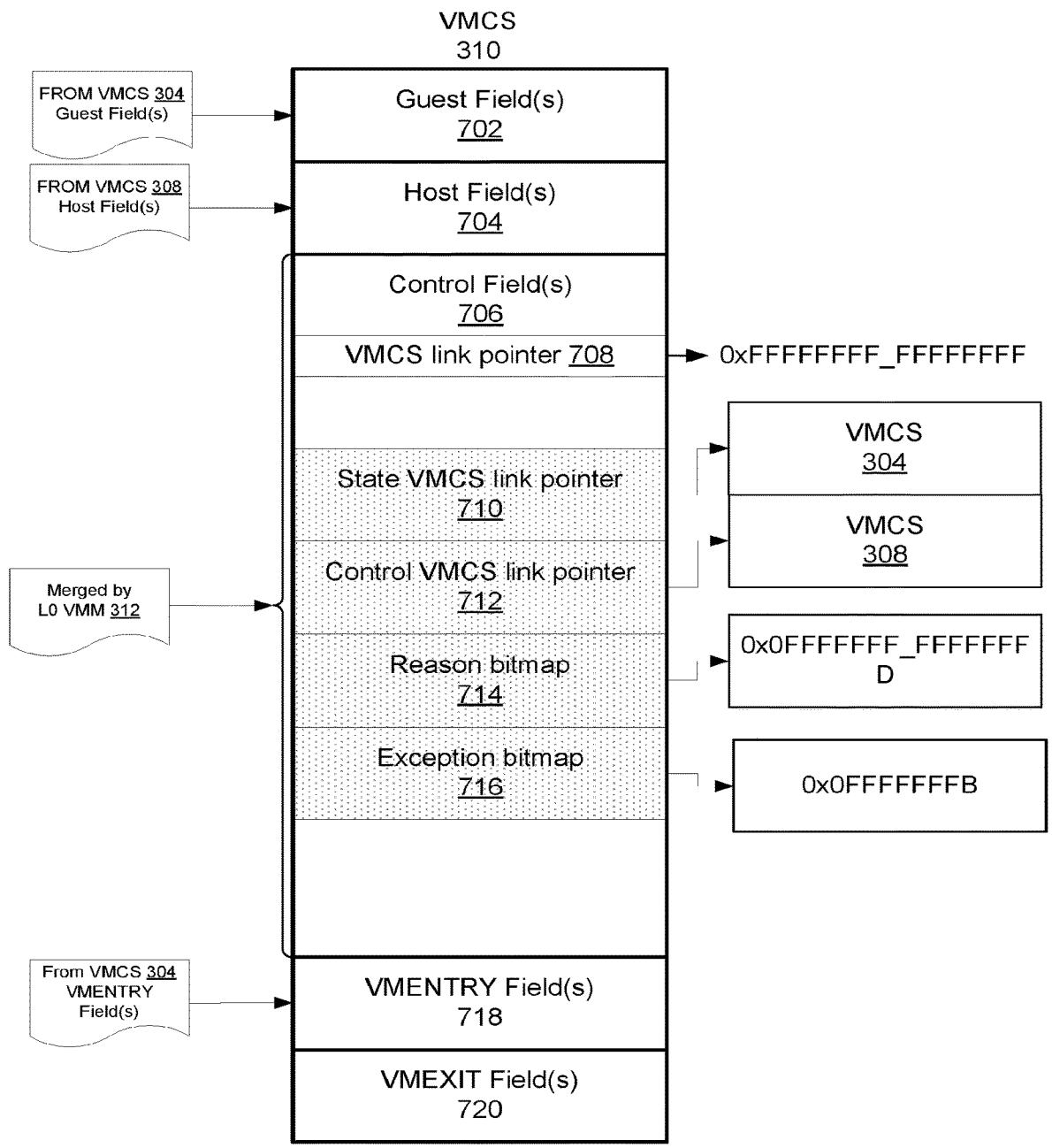
FIG. 7 illustrates the virtual machine control structure (VMCS) prior to transferring resource control to the L2 guest according to one embodiment.

FIG. 7 illustrates the VMCS 310 prior to transferring resource control to L2 guest 302 (illustrated in FIG. 3) according to one embodiment. The VMCS 310 can include guest field(s) 702, host field(s) 704, control field(s) 706, and VMEXIT control field(s). In one example, the control field (s) can include an exit control field and an execution control field. The VMEXIT control fields can include: a VMCS link pointer 708, a state VMCS link pointer 710, a control VMCS link pointer 712, a reason bitmap 714, an exception bitmap 716, VMENTRY field(s) 718, and VMEXIT fields(s) 720. The guest field(s) 702 can include data copied from guest fields of the VMCS 304. The host field(s) 704 can include data copied from host field(s) of the VMCS 308.

In one embodiment, the control fields 706 can include data merged from VMCS 308 and VMCS 304. In another embodiment, different VMMs operating in the non-root mode may use data formats or different algorithm and the VMM 312 can merge the different VMMs.

The control fields 706 can include: VMCS link pointer 708, a state VMCS link pointer 710, a control VMCS link pointer 712, a reason bitmap 714, and an exception bitmap 716. The VMCS link pointer 708 can include an address to a VMCS link. For example, the address of the VMCS link pointer 708 can be 0xFFFFFFFF_FFFFFFFF, indicating that the VMCS link pointer 708 is invalid. The state VMCS link pointer 710 can be linked to VMCS 304 when L0 VMM 312 launches the L2 guest 302 on behalf of L1 VMM 306. When resuming to a L1 VMM 306 state, the state VMCS link pointer 710 should be set to invalid, such as (0xFFFFFFFF_FFFFFFFF). The control VMCS link pointer 712 can be linked to VMCS 308 when L0 VMM 312 launches the L2 guest 302 on behalf of L1 VMM 306. When resource control is transferred to L1 VMM 306, this field should be set to invalid, such as (0xFFFFFFFF_FFFFFFFF). The reason bitmap 714 can point to a memory address when resource control is transferred to L2 guest. In one example, the VMEXIT reason can be a VMEXIT reason 412 (illustrated in FIG. 4B). In one example, the memory address can be 128-bits. In another example, the size of the memory address can be increased to exceed the 128-bit field size when a number of VMEXIT reason exceeds 127, where the reason bitmap 714 stores an address in the memory for the VMEXIT reason. In another example, when the nth bit of the reason bitmap 714 is set in the memory, the VMEXIT reason n (illustrated in FIG. 4B) will cause a transfer of resources to L1 VMM 306. When resuming to L1 VMM 306, the reason bitmap 714 is set to invalid, such as 0xFFFFFFFF_FFFFFFFF.

The exception bitmap 716 is a bit field that contains one bit for each exception that can cause a VMEXIT. In one example, the exception bitmap 716 is a 32-bit field. In another example, the VMEXIT exception bitmap 716 is not used when bit 0 of the reason bitmap 714 is clear. For example, when bit 0 of the reason bitmap 714 is set and the nth bit of reason bitmap 714 is set, the exception with vector n will not cause a transfer of resources from L2 guest 302 to L0 VMM 312. In this example, a transfer of resources from L2 guest 302 to L1 VMM 306 will occur. In another example, when both bit 0 in the reason bitmap and bit 2 in exception bitmap are set to one, a VMEXIT is triggered by a NMI and a transfer of resources from L2 guest 302 to L1 VMM 306 will occur. In another example, when resuming to the L1 VMM 306, the reason bitmap 714 is set to zero, which indicates all VMEXITs cause a transfer of resources from L2 guest 302 to Lo VMM 312.

In one embodiment, to enable a transfer of resources from L2 guest 302 to L1 VMM 306, the state VMCS link pointer 710, the control VMCS link pointer 712, and the reason bitmap 714 are valid before a VMLAUNCH or a VMRESUME is executed. The VMEXIT field(s) 720 may not be updated because the VMEXIT field(s) 720 are not used in the VMENTER or VMRESUME events. In another example, the VMEXIT field(s) 720 are used in the VMEXIT event.

Figure 8:
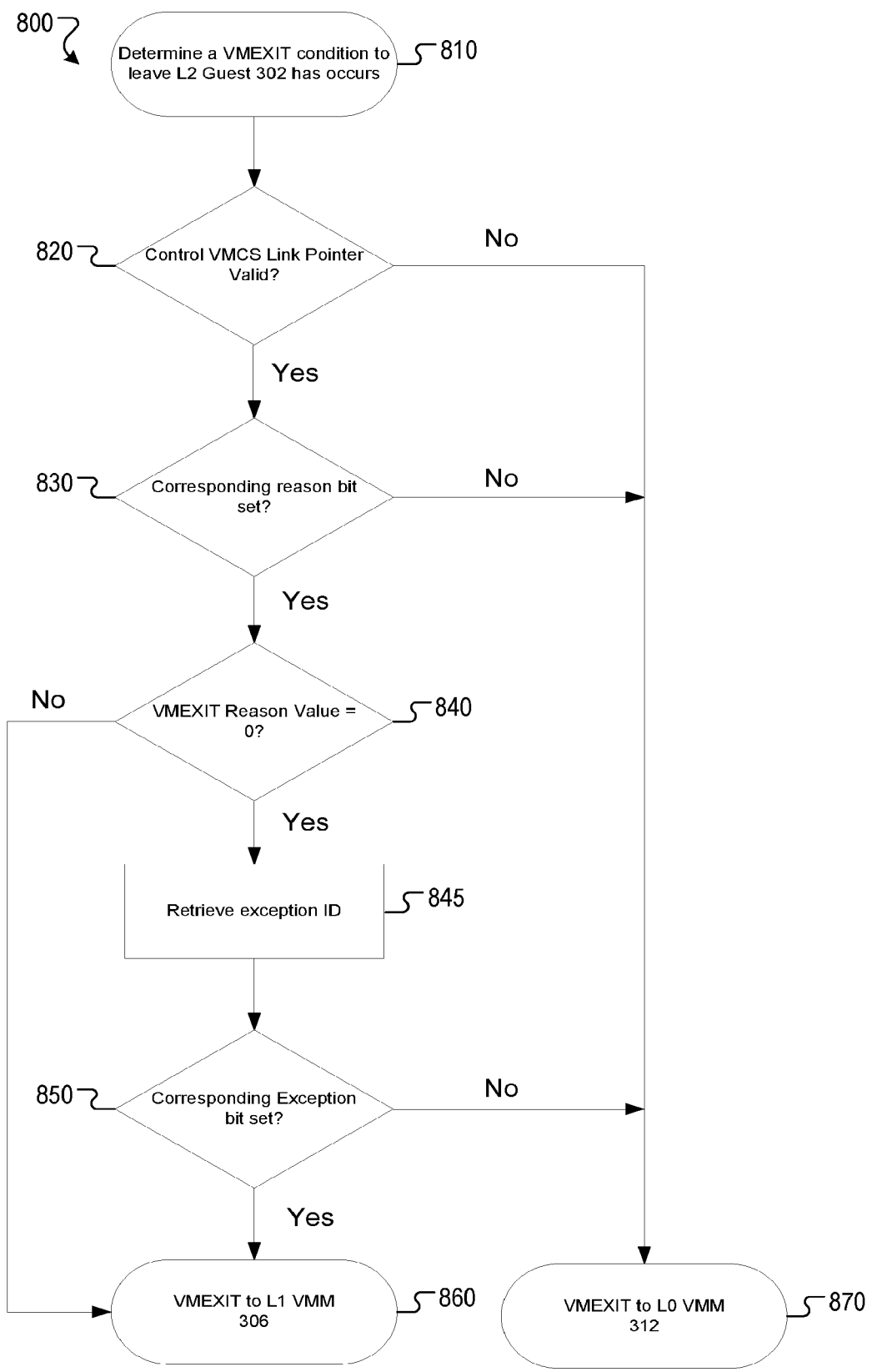
FIG. 8 illustrates depicts a flow diagram of a method to switch resource control from the L2 guest to the L1 VMM or the L0 VMM according to one embodiment.

FIG. 8 illustrates depicts a flow diagram of a method 800 to switch resource control from the L2 guest 302 to the L1 VMM 306 or the L0 VMM 312 (illustrated in FIG. 3) according to one embodiment. Method 800 may be performed by a computer system or a software library (such as a runtime library) executed by a processor of the computing system. Method 800 and/or each of its functions, routines, subroutines, or operations may be performed by one or more physical processors of the computer system executing the method. Two or more functions, routines, subroutines, or operations of method 800 may be performed in parallel or in an order that may differ from the order described above. In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other.

Referring to FIG. 8, the method 800 may begin with a processor or software library (such as a runtime library) executed by the processor determining a VMEXIT condition to transfer resource control from L2 guest 302 to L1 VMM 306 or L0 VMM 312 has occurs (810). The method can include determining whether the control VMCS link pointer of a current VMCS is valid (820). In one example, the control VMCS link pointer is invalid when it is set to 0xFFFFFFFF_FFFFFFFF and is valid otherwise. The method can include transferring resource control from L2 guest 302 to L0 VMM 312 when the control VMCS link pointer is not valid (870). The method can include determining, when the control VMCS link pointer is valid, whether a reason bit corresponding to a current VMEXIT reason for an VMEXIT is set (830). For example, if a current VMEXIT reason is an $n^{th}$ VMEXIT reason in the table of VMEXIT event 420 (illustrated in FIG. 4B), then the processing device checks a bit in the $n^{th}$ position in memory referenced that is referenced by a reason bitmap pointer. The method can include transferring resource control from L2 guest 302 to L0 VMM 312 when the corresponding reason bit is not set (870). The method can include determining, when the corresponding VMEXIT reason value is set, whether the VMEXIT reason value is set to zero (840). For example, when the VMEXIT reason value for the $n^{th}$ position is zero then a VMEXIT event is triggered by one of exceptions in a guest VM.

The method can include transferring resource control from L2 guest 302 to L1 VMM 306 when the reason bit is not set to 0 (860). The method can further include retrieving, when the reason bit is set to zero, an exception ID for the $n^{th}$ VMEXIT reason from VMEXIT information of a current VMCS (845). The method can include determining, whether an exception bit corresponding to the reason bit for the exception ID is set (850). In one example, when a reason or trigger of a VMEXIT is an exception or NMI (e.g., a basic exit reason is 0), the VMEXIT is triggered by reason zero. In this example, the VMEXIT is an exception vector (e.g., a two for the NMI) is checked with the exception bitmap 716.

The method can include transferring resource control from L2 guest 302 to L0 VMM 312 when the corresponding exception bit is not set (870). The method can include transferring resource control from L2 guest 302 to L1 VMM 306 when the corresponding exception bit is set (860).

Figure 9:
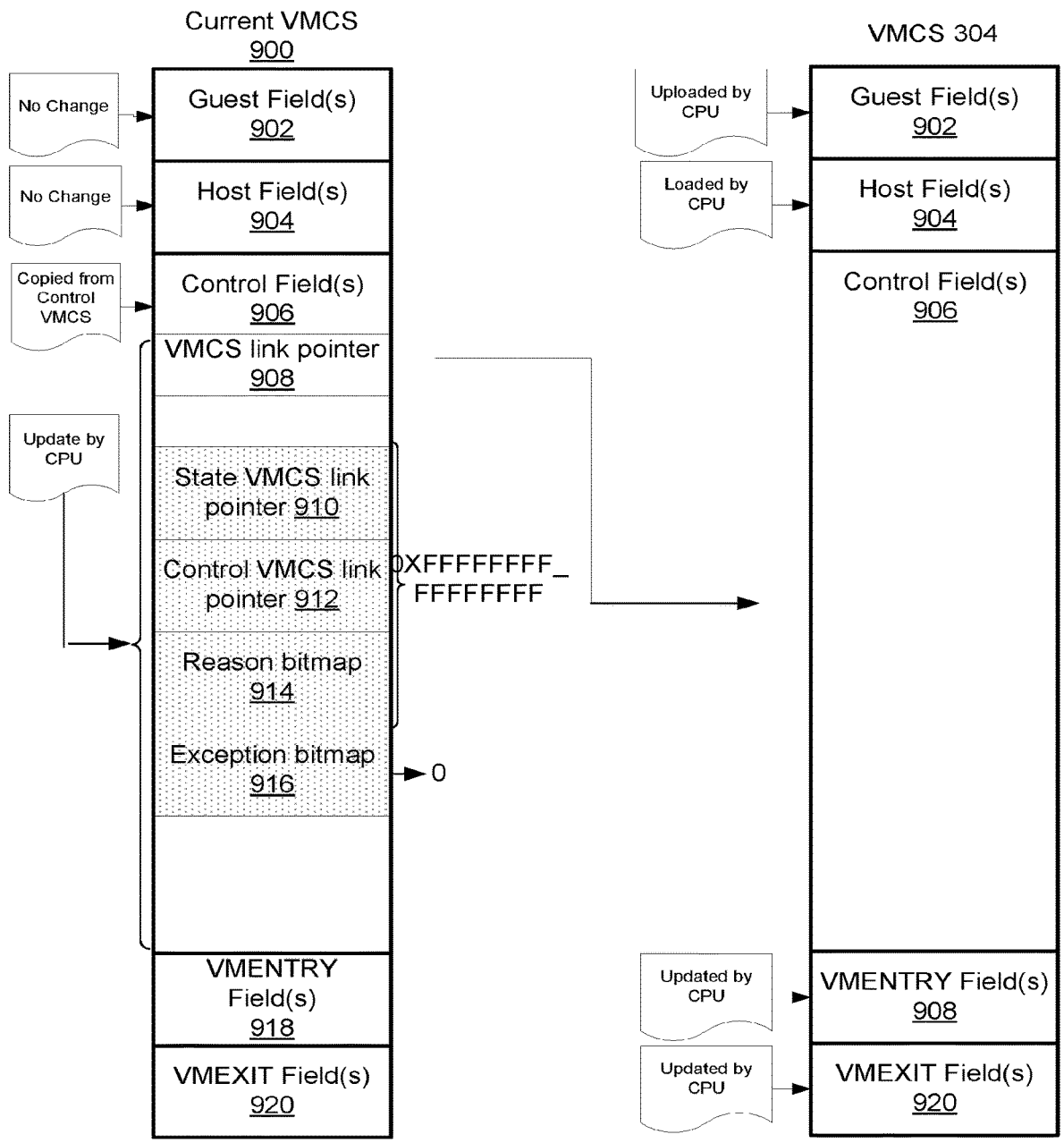
FIG. 9 illustrates switching a current VMCS to the VMCS when transferring resource control from the L2 guest to the L1 VMM has occurred according to one embodiment.

FIG. 9 illustrates switching a current VMCS to the VMCS 304 (illustrated in FIG. 3) when transferring resource control from the L2 guest 302 to the L1 VMM 306 has occurred according to one embodiment. The current VMCS 900 can include guest field(s) 902, host field(s) 904, control field(s) 906, a VMCS link pointer 908, a state VMCS link pointer 910, a control VMCS link pointer 912, a reason bitmap 914, an exception bitmap 916, VMENTRY field(s) 918, and VMEXIT fields(s) 920.

In one embodiment, when transferring resource control from L2 guest 302 to L1 VMM 306, the data fields of the current VMCS 900 can be changed. In one example, processor states are saved to guest field(s) 902 that are pointed to by the state VMCS link pointer 908 (illustrated in FIG. 3).

In one example, the state VMCS link pointer 908 may point to VMCS 304. When the processor states from the L2 guest 302 are saved to the guest fields 902, the L1 VMM 306 can then retrieve the guest fields from the VMCS 304 directly. In another example, the processor states can be loaded from processor states of the processing device to host fields 904 from host fields pointed to by state VMCS link pointer. In one example, the processor states is a context for a processor of the processing device to run. The processor state can be stored in a guest field to make the field values available from a host. When the processor states are loaded from host fields, the processor can run in host mode.

The processor states loaded to host fields 904 can be used to setup a working context for L1 VMM 306 and setup a handler code for the L1 VMM 306 that runs after the VMEXIT. In one example, the working context is a serial of registers (such as eax, ebx, ecx, edx, esp, ebp, CS, DS, ES, FS, SS, or model-specific registers) and memory contexts pointed to by these registers (such as interrupt descriptor tables pointed to by interrupt descriptor table registers or global descriptor tables pointed to by global descriptor table registers).

In one embodiment, the control field(s) 906 can include data copied from control fields of a VMCS pointed to by the control VMCS link pointer 908. For example, the control field(s) 906 can be updated for the current VMCS 900 by copying the data in the control fields of the VMCS pointed to by the control VMCS link pointer 912. In another example, when resources are controlled by the L1 guest 302, a condition to generate a VMEXIT can be configured from VMCS 308. In another example, the VMENTRY field(s) 908 can be update with the processor states by clearing a highest bit of a VMENTRY interruption field. The VMEXIT field(s) can be update with the processor states based on different VMEXIT reasons.

In another embodiment, the VMCS link pointer 908 and the control VMCS link pointer 912 can be updated by the processor. In one example, the VMCS link pointer 908 of the current VMCS 900 is set with the value in the state VMCS link pointer 910, when transferring of resource control to L1 VMM. When the VMCS link pointer 908 and the control VMCS link pointer 912 are updated, the L1 VMM 306 can retrieve the VMCS link pointer 908 and the control VMCS link pointer 912.

In another embodiment, the state VMCS link pointer 910, the control VMCS link pointer 912, the reason bitmap 914, and the exception bitmap 916 can be disabled by setting each of these data field to a fixed value, where the fixed value can be predefined. For example, the state VMCS link pointer 910, the control VMCS link pointer 912, and the reason bitmap 914 can be set to 0xFFFFFFFF_FFFFFFFF and the exception bitmap can be set to zero. The state VMCS link pointer 910, the control VMCS link pointer 912, the reason bitmap 914, and the exception bitmap 916 can be disabled to avoid nesting. In another embodiment, the VMENTRY fields 918 are updated by copying data that is pointed to by state VMCS link pointer 910. In another embodiment, the VMENTRY fields 918 can be updated by clearing a valid bit in a VMENTRY interruption information field. The updating of the VMENTRY field 918 can simulate a change in the VMENTRY fields 918 during a transfer of resource control. The VMCS 304 is the VMCS 900 after the VMCS 900 has been updated following the transfer of resource control.

In one example, after the transfer of resource control, the L1 VMM 306 can be executed in a non-root mode. The L1 VMM 306 can read and write VMCS fields directly. In another example, when a violation has occurred, a transfer of resource control from L0 VMM 312 to L2 guest 302 can occur. In one embodiment, the violation can be triggering a VMRESUME event.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation, etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following example implementations may be described with reference to energy conservation and energy efficiency in specific integrated circuits, such as in computing platforms or microprocessors, other example implementations are applicable to other types of integrated circuits and logic devices. Similar techniques and teachings of example implementations described herein may be applied to other types of circuits or semiconductor devices that may also benefit from better energy efficiency and energy conservation. For example, the disclosed example implementations are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the example implementations of methods, apparatus', and systems described herein (whether in reference to hardware, firmware, software, or a combination thereof) are vital to a 'green technology' future balanced with performance considerations.

Although the following example implementations are described with reference to a processor, other example implementations are applicable to other types of integrated circuits and logic devices. Similar techniques and teachings of example implementations of the present disclosure can be applied to other types of circuits or semiconductor devices that can benefit from higher pipeline throughput and improved performance. The teachings of example implementations of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of example implementations of the present disclosure rather than to provide an exhaustive list of all possible implementations of example implementations of the present disclosure.

Although the below examples describe instruction handling and distribution in the context of execution units and logic circuits, other example implementations of the present disclosure can be accomplished by way of a data or instructions stored on a machine-readable, tangible medium, which when performed by a machine cause the machine to perform functions consistent with at least one example implementation of the present disclosure. In one example implementation, functions associated with example implementations of the present disclosure are embodied in machine-executable instructions. The instructions can be used to cause a general-purpose or special-purpose processor that is programmed with the instructions to perform the steps of the present disclosure. Example implementations of the present disclosure may be provided as a computer program product or software that may include a machine or computer-readable medium having stored thereon instructions that may be used to program a computer (or other electronic devices) to perform one or more operations according to example implementations of the present disclosure. Alternatively, steps of example implementations of the present disclosure might be performed by specific hardware components that contain fixed-function logic for performing the steps, or by any combination of programmed computer components and fixed-function hardware components.

Instructions used to program logic to perform example implementations of the present disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of example implementations of the present disclosure.

In modern processors, a number of different execution units are used to process and execute a variety of code and instructions. Not all instructions are created equal, as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one example implementation, an instruction set may be associated with one or more computer architectures, including data types, instructions, register architecture, addressing modes, memory architecture, interrupt and exception handling, and external input and output (I/O).

In one example implementation, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one example implementation, registers may include one or more registers, register architectures, register files, or other register sets that may or may not be addressable by a software programmer.

In one example implementation, an instruction may include one or more instruction formats. In one example implementation, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one example implementation, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one example implementation, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one example implementation, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one example implementation, a packed data item or vector may be a sequence of packed data elements stored within a single register, and a packed data operand or a vector operand may a source or destination operand of a SIMD instruction (or 'packed data instruction' or a 'vector instruction'). In one example implementation, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one example implementation, destination and source registers/data are generic terms to represent the source and destination of the corresponding data or operation. In some example implementations, they may be implemented by registers, memory, or other storage areas having other names or functions than those depicted. For example, in one example implementation, "DEST1" may be a temporary storage register or other storage area, whereas "SRC1" and "SRC2" may be a first and second source storage register or other storage area, and so forth. In other example implementations, two or more of the SRC and DEST storage areas may correspond to different data storage elements within the same storage area (e.g., a SIMD register). In one example implementation, one of the source registers may also act as a destination register by, for example, writing back the result of an operation performed on the first and second source data to one of the two source registers serving as a destination registers.

Figure 10:
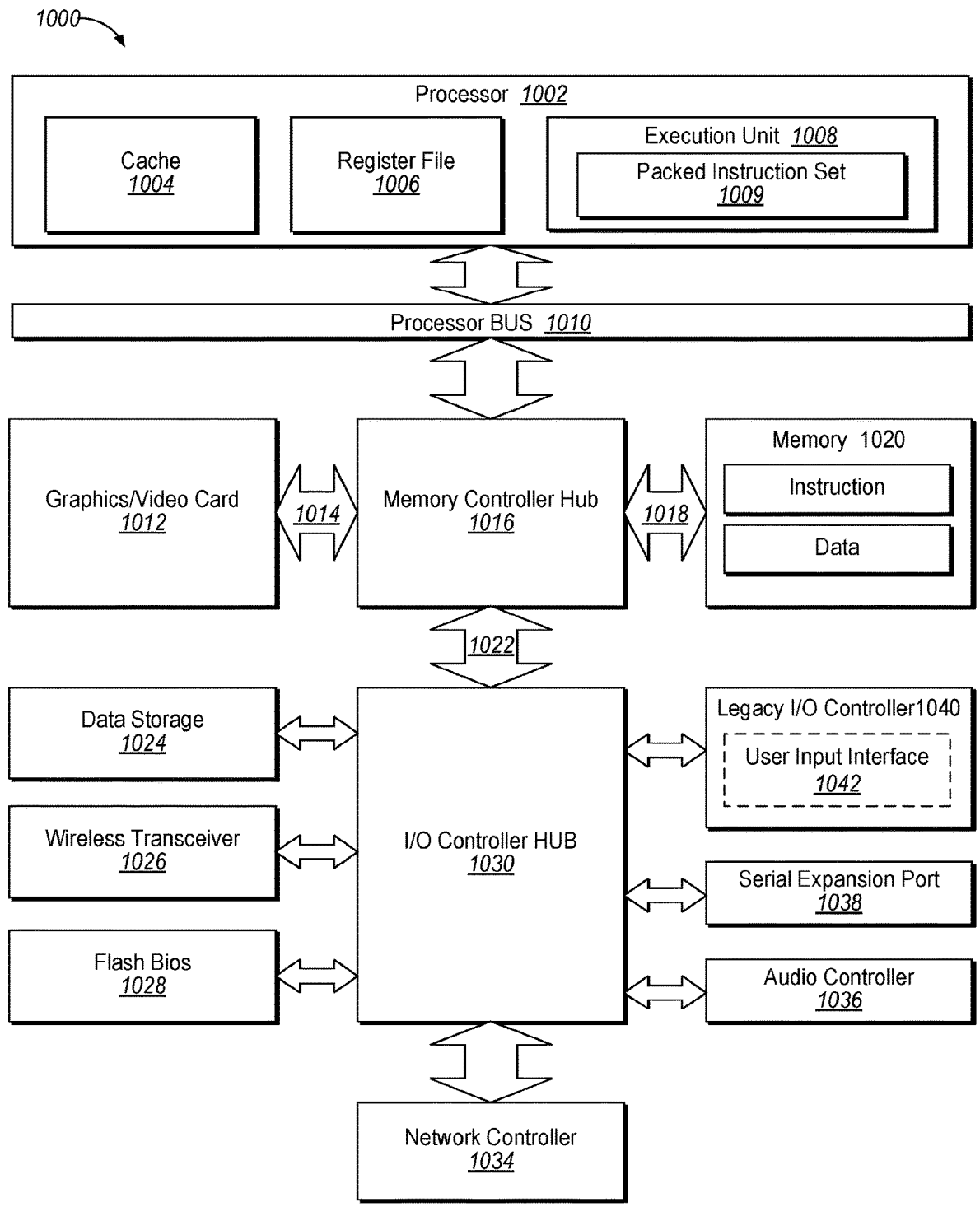
FIG. 10 schematically illustrates a block diagram of a system according to one example implementation.

Turning to FIG. 10, a block diagram of an exemplary computer system formed with a processor that includes execution units to execute an instruction, where one or more of the interconnects implement one or more features in accordance with one example implementation of the present disclosure is illustrated. System 1000 includes a component, such as a processor 1002 to employ execution units including logic to perform algorithms for process data, in accordance with the present disclosure, such as in the example implementation described herein. System 1000 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one example implementation, sample system 1000 executes a version of the WINDOWS™ operating system available from Microsoft Corporation of Redmond, Wash., although other operating systems (UNIX and Linux for example), embedded software, and/or graphical user interfaces, may also be used. Thus, example implementations of the present disclosure are not limited to any specific combination of hardware circuitry and software.

Example implementations are not limited to computer systems. Alternative example implementations of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one example implementation.

In this illustrated example implementation, processor 1002 includes one or more execution units 1008 to implement an algorithm that is to perform at least one instruction. One example implementation may be described in the context of a single processor desktop or server system, but alternative example implementations may be included in a multiprocessor system. System 1000 is an example of a 'hub' system architecture. The computer system 1000 includes a processor 1002 to process data signals. The processor 1002, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1002 is coupled to a processor bus 1010 that transmits data signals between the processor 1002 and other components in the system 1000. The elements of system 1000 (e.g. graphics accelerator 1012, memory controller hub 1016, memory 1020, I/O controller hub 1024, wireless transceiver 1026, Flash BIOS 1028, Network controller 1034, Audio controller 1036, Serial expansion port 1038, I/O controller 1040, etc.) perform their conventional functions that are well known to those familiar with the art.

In one example implementation, the processor 1002 includes a Level 1 (L1) internal cache memory 1004. Depending on the architecture, the processor 1002 may have a single internal cache or multiple levels of internal caches. Other example implementations include a combination of both internal and external caches depending on the particular implementation and needs. Register file 1006 is to store different types of data in various registers including integer registers, floating point registers, vector registers, banked registers, shadow registers, checkpoint registers, status registers, and instruction pointer register.

Execution unit 1008, including logic to perform integer and floating point operations, also resides in the processor 1002. The processor 1002, in one example implementation, includes a microcode (ucode) ROM to store microcode, which when executed, is to perform algorithms for certain macroinstructions or handle complex scenarios. Here, microcode is potentially updateable to handle logic bugs/fixes for processor 1002. For one example implementation, execution unit 1008 includes logic to handle a packed instruction set 1009. By including the packed instruction set 1009 in the instruction set of a general-purpose processor 1002, along with associated circuitry to execute the instructions, the operations used by many multimedia applications may be performed using packed data in a general-purpose processor 1002. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate example implementations of an execution unit 1008 may also be used in micro controllers, embedded processors, graphics devices, DSPs, and other types of logic circuits. System 1000 includes a memory 1020. Memory 1020 includes a dynamic random access memory (DRAM) device, a static random access memory (SRAM) device, flash memory device, or other memory device. Memory 1020 stores instructions and/or data represented by data signals that are to be executed by the processor 1002.

A system logic chip 1016 is coupled to the processor bus 1010 and memory 1020. The system logic chip 1016 in the illustrated example implementation is a memory controller hub (MCH). The processor 1002 can communicate to the MCH 1016 via a processor bus 1010. The MCH 1016 provides a high bandwidth memory path 1018 to memory 1020 for instruction and data storage and for storage of graphics commands, data and textures. The MCH 1016 is to direct data signals between the processor 1002, memory 1020, and other components in the system 1000 and to bridge the data signals between processor bus 1010, memory 1020, and system I/O 1022. In some example implementations, the system logic chip 1016 can provide a graphics port for coupling to a graphics controller 1012. The MCH 1016 is coupled to memory 1020 through a memory interface 1018. The graphics card 1012 is coupled to the MCH 1016 through an Accelerated Graphics Port (AGP) interconnect 1014.

System 1000 uses a proprietary hub interface bus 1022 to couple the MCH 1016 to the I/O controller hub (ICH) 1030. The ICH 1030 provides direct connections to some I/O devices via a local I/O bus. The local I/O bus is a high-speed I/O bus for connecting peripherals to the memory 1020, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another example implementation of a system, an instruction in accordance with one example implementation can be used with a system on a chip. One example implementation of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 11:
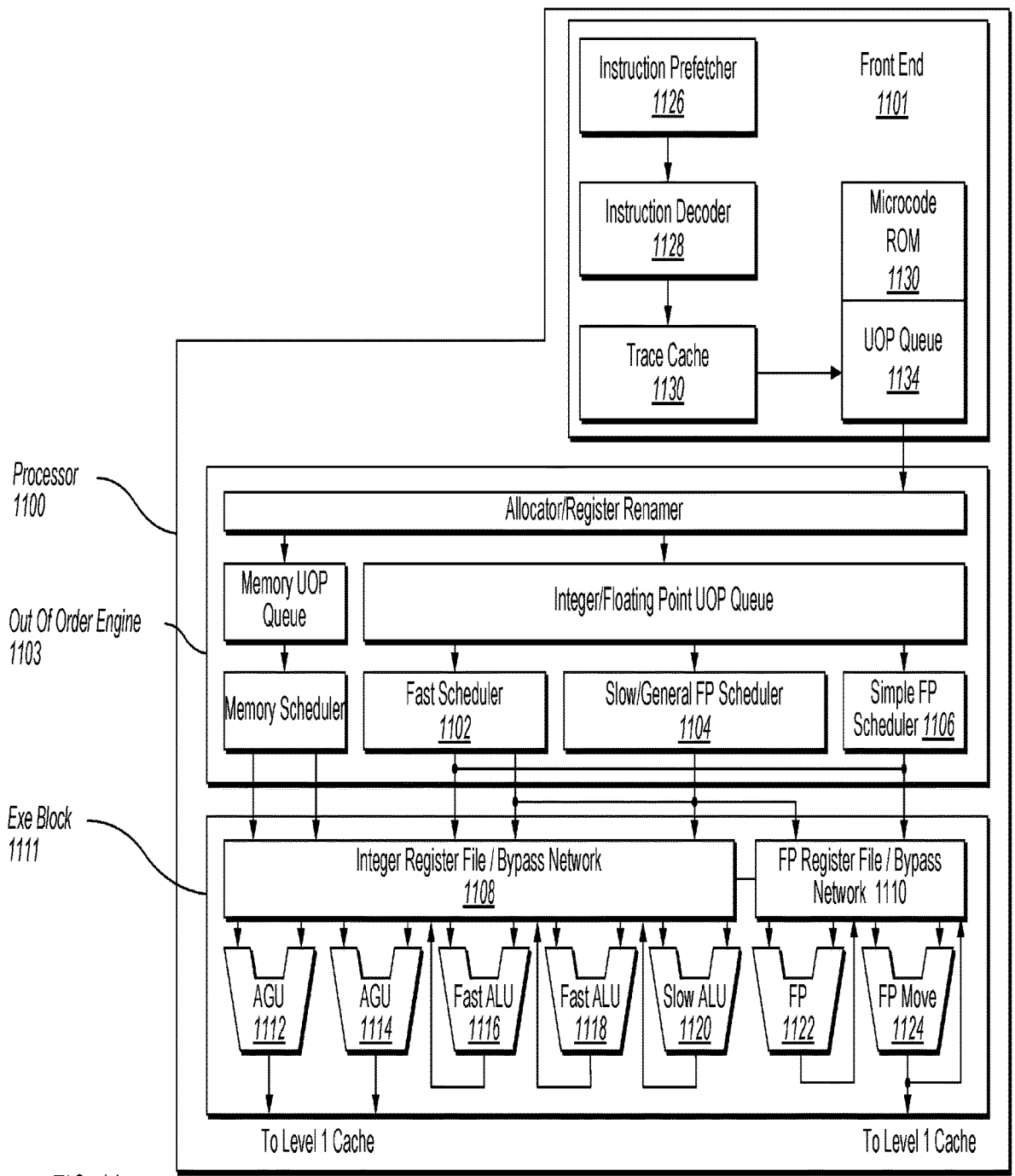
FIG. 11 schematically illustrates a block diagram of a processor according to one example implementation.

FIG. 11 is a block diagram of the micro-architecture for a processor 1100 that includes logic circuits to perform instructions in accordance with one example implementation of the present disclosure. In some example implementations, an instruction in accordance with one example implementation can be implemented to operate on data elements having sizes of byte, word, doubleword, quadword, etc., as well as datatypes, such as single and double precision integer and floating point datatypes. In one example implementation the in-order front end 1101 is the part of the processor 1100 that fetches instructions to be executed and prepares them to be used later in the processor pipeline. The front end 1101 may include several units. In one example implementation, the instruction prefetcher 1126 fetches instructions from memory and feeds them to an instruction decoder 1128 which in turn decodes or interprets them. For example, in one example implementation, the decoder decodes a received instruction into one or more operations called "micro-instructions" or "micro-operations" (also called micro op or uops) that the machine can execute. In other example implementations, the decoder parses the instruction into an opcode and corresponding data and control fields that are used by the micro-architecture to perform operations in accordance with one example implementation. In one example implementation, the trace cache 1130 takes decoded uops and assembles them into program ordered sequences or traces in the uop queue 1134 for execution. When the trace cache 1130 encounters a complex instruction, the microcode ROM 1132 provides the uops needed to complete the operation.

Some instructions are converted into a single micro-op, whereas others need several micro-ops to complete the full operation. In one example implementation, if more than four micro-ops are needed to complete an instruction, the decoder 1128 accesses the microcode ROM 1132 to do the instruction. For one example implementation, an instruction can be decoded into a small number of micro ops for processing at the instruction decoder 1128. In another example implementation, an instruction can be stored within the microcode ROM 1132 should a number of micro-ops be needed to accomplish the operation. The trace cache 1130 refers to an entry point programmable logic array (PLA) to determine a correct micro-instruction pointer for reading the micro-code sequences to complete one or more instructions in accordance with one example implementation from the microcode ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1102, slow/general floating-point scheduler 1104, and simple floating-point scheduler 1106. The uop schedulers 1102, 1104, 1106, determine when a uop is ready to execute based on the readiness of their dependent input register operand sources and the availability of the execution resources the uops need to complete their operation. The fast scheduler 1102 of one example implementation can schedule on each half of the main clock cycle while the other schedulers can only schedule once per main processor clock cycle. The schedulers arbitrate for the dispatch ports to schedule uops for execution.

Register files 1108, 1110, sit between the schedulers 1102, 1104, 1106, and the execution units 1112, 1114, 1116, 1118, 1120, 1122, 1124 in the execution block 1111. There is a separate register file 1108, 1110, for integer and floating point operations, respectively. Each register file 1108, 1110, of one example implementation also includes a bypass network that can bypass or forward just completed results that have not yet been written into the register file to new dependent uops. The integer register file 1108 and the floating-point register file 1110 are also capable of communicating data with the other. For one example implementation, the integer register file 1108 is split into two separate register files, one register file for the low order 32 bits of data and a second register file for the high order 32 bits of data. The floating-point register file 1110 of one example implementation has 128-bit wide entries because floating-point instructions typically have operands from 64 to 128 bits in width.

The execution block 1111 contains the execution units 1112, 1114, 1116, 1118, 1120, 1122, 1124, where the instructions are actually executed. This section includes the register files 1108, 1110, that store the integer and floating-point data operand values that the micro-instructions need to execute. The processor 1100 of one example implementation is comprised of a number of execution units: address generation unit (AGU) 1112, AGU 1114, fast ALU 1116, fast ALU 1118, slow ALU 1120, floating point ALU 1122, floating point move unit 1124. For one example implementation, the floating-point execution blocks 1122, 1124, execute floating point, MMX, SIMD, and SSE, or other operations. The floating point ALU 1122 of one example implementation includes a 64 bit by 64 bit floating point divider to execute divide, square root, and remainder micro-ops. For example implementations of the present disclosure, instructions involving a floating-point value may be handled with the floating-point hardware. In one example implementation, the ALU operations go to the high-speed ALU execution units 1116, 1118. The fast ALUs 1116, 1118, of one example implementation can execute fast operations with an effective latency of half a clock cycle. For one example implementation, most complex integer operations go to the slow ALU 1120 as the slow ALU 1120 includes integer execution hardware for long latency type of operations, such as a multiplier, shifts, flag logic, and branch processing. Memory load/store operations are executed by the AGUs 1112, 1114. For one example implementation, the integer ALUs 1116, 1118, 1120, are described in the context of performing integer operations on 64-bit data operands. In alternative example implementations, the ALUs 1116, 1118, 1120, can be implemented to support a variety of data bits including 16, 32, 128, 256, etc. Similarly, the floating-point units 1122, 1124, can be implemented to support a range of operands having bits of various widths. For one example implementation, the floating-point units 1122, 1124, can operate on 128 bits wide packed data operands in conjunction with SIMD and multimedia instructions.

In one example implementation, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one example implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an example implementation should not be limited in meaning to a particular type of circuit. Rather, a register of an example implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one example implementation, integer registers store thirty-two bit integer data. A register file of one example implementation also contains eight multimedia SIMD registers for packed data. For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one example implementation, in storing packed data and integer data, the registers do not need to differentiate between the two data types. In one example implementation, integer and floating point are either contained in the same register file or different register files. Furthermore, in one example implementation, floating point and integer data may be stored in different registers or the same registers.

In accordance with one or more aspects of the present disclosure, a processing system, such as processing system, may comprise one or more processing core coupled to an architecturally protected memory. In certain implementations, the processing system may implement Software Guard Extensions (SGX), which is a set of extensions of Intel® architecture that allow an application to instantiate a protected container, referred to as an enclave.

Figure 12:
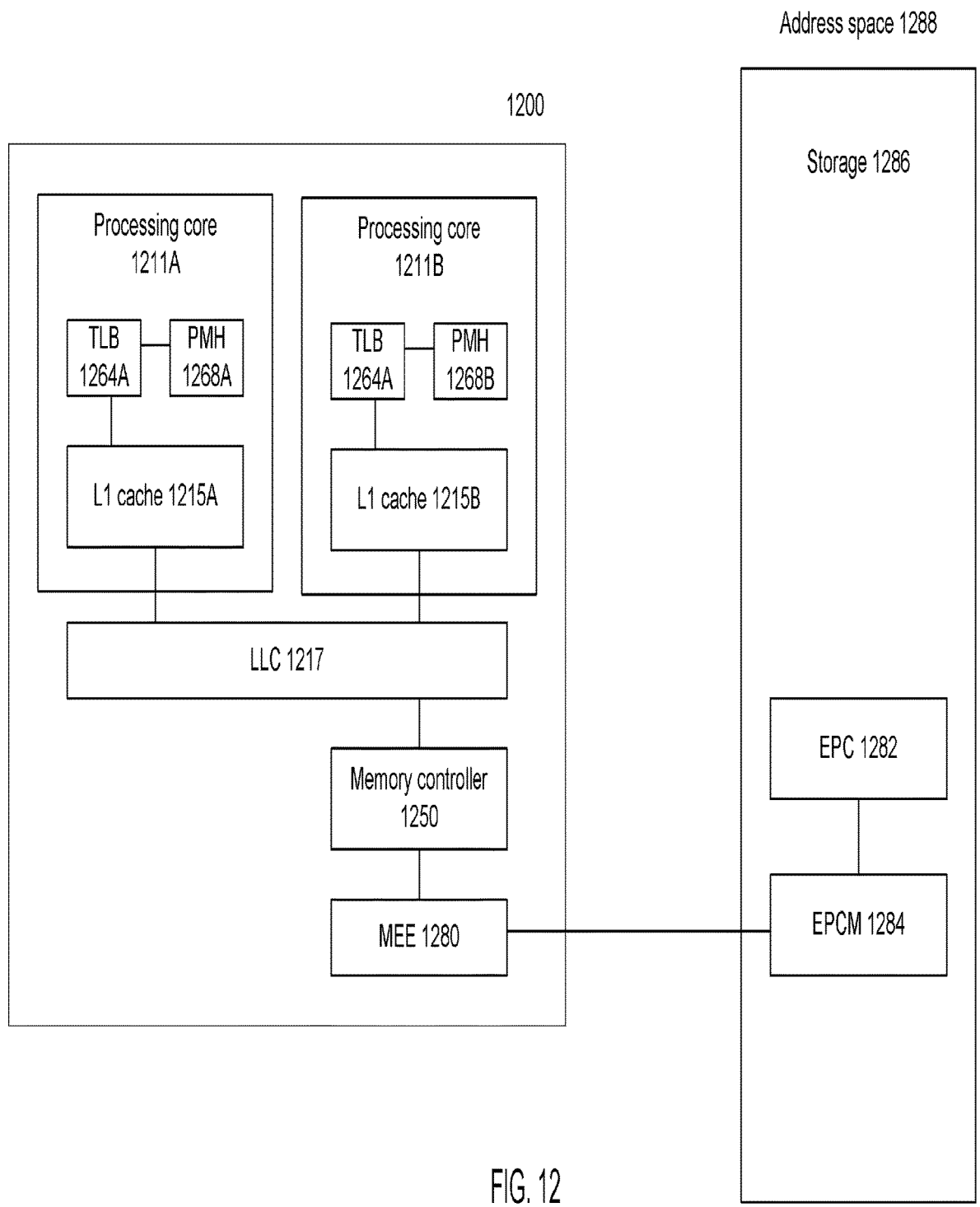
FIG. 12 schematically illustrates a block diagram of an example processing system operating in accordance with one or more aspects of the present disclosure.

Referring now to FIG. 12, shown is a block diagram of an example processing system in accordance with one or more aspects of the present disclosure. As shown in FIG. 12, processing system 1200 may include one or more processing cores 1211, each processing core 1211 having a local first level (L1) cache 1215 associated therewith. L1 cache 1215 may be communicatively coupled to a shared last level cache (LLC) 1217. In an illustrative example, the cache hierarchy comprising L1 cache 1215 and LLC 1217 may be configured as an inclusive cache hierarchy, such that at least part of the information stored in L1 cache 1215 may also be stored in LLC 1217.

In accordance with one or more aspects of the present disclosure, processing system 1200 may comprise an architecturally protected memory. Processing core 1211 may comprise processing logic configured to implement a secure enclave by executing instructions residing in the protected memory and accessing data residing in the protected memory, while preventing unauthorized access to the protected memory even by privileged applications, as described in more details herein below.

An active secure enclave may be divided into an encrypted portion and a decrypted portion. The encrypted portion may reside in an unprotected memory (such as main memory or disk). The decrypted portion resides in the enclave page cache (EPC) 1282. The EPC is a protected memory used by the processing system to temporarily store enclave pages when they are not cryptographically protected.

A processing system that supports SGX and implements EPC in a cryptographically protected platform memory supports the ability for the BIOS to reserve a range(s) of memory called Processor Reserved Memory (PRM). The BIOS allocates the PRM by configuring a set of range registers, collectively known as the PRMRR. The EPC is allocated within the PRM. CPU memory protection mechanisms physically block access to PRM from all external agents (DMA, graphic engine, etc.), by treating such accesses as references to non-existent memory.

The EPC may be divided into pages of a pre-defined size, which may be referred to as EPC pages. The EPC is protected from any accesses by software residing outside the enclave. Furthermore, unauthorized parties will not be able to read or modify plain-text data belonging to enclaves that is loaded into the EPC via straight-forward hardware attacks. The EPC is located within the physical address space of the processing system, but can only be accessed using privileged or non-privileged enclave instructions used to build and enable an enclave, enter/exit the enclave, manage EPC, and perform various other operations.

There are several mechanisms of implementing the EPC. The EPC may be implemented as on on-die static random access memory (SRAM) or dynamic random access memory (DRAM). Alternatively, the EPC may be constructed by sequestering ways of the CPU's last-level cache. Another mechanism of implementing EPC is the Memory Encryption Engine (MEE). MEE herein shall refer to a hardware-implemented processing logic that encrypts the traffic between the processor package and the platform DRAM, thus providing a mechanism of creating a cryptographically protected volatile storage using the platform DRAM. MEE may intercept attempted memory accesses and route those accesses to a cryptographic controller, which may generate one or more memory accesses to the platform DRAM to fetch the cipher-text, processes the cipher-text to generate the plain-text, and satisfy the original memory access request.

Referring again to FIG. 12, L1 cache 1215 can transfer data to and from the LLC 1220. Memory controller 1250 can be connected to the last level cache 1220 and to MEE 1280. Memory controller 1250 can assess EPC 1282 residing on backing storage device 1286 within physical address space 1288.

An Enclave Page Cache Map (EPCM) is a protected structure employed by the processing system to track the contents of the EPC. EPCM 1284 may comprise a plurality of entries with each entry corresponding to a page in the EPC. Each EPCM entry may hold, in an implementation-dependent format, the following information: whether the EPC page is valid or invalid; an identifier of the enclave instance that owns the page; the type of the page (REG, TCS, VA, SECS); the virtual address through which the enclave is allowed to access the page; read/write/execute permissions for the page; whether the page is accessible or not (BLOCKED or UNBLOCKED).

EPCM 1284 may be used by the processing system in the address translation flow to enforce access-control on the enclave pages loaded into the EPC. Logically it provides an additional secure layer of access control in addition to "legacy" segmentation, paging tables and extended paging tables mechanisms.

The EPC, EPCM, and various other implementation-specific data structures may be mapped to locations inside the architecturally protected memory. When a request to access the EPC is generated, processing system 1200 may remap the request to the backing storage location containing encrypted EPC data, and retrieve the data.

Various enclave-related functions may be implemented in the microcode, supported by the hardware implementations of MEE and the processing logic implementing the enclave functionality. In certain implementations, the processing logic may control access to EPC 1282 via a translation lookaside buffer (TLB) 1264 and a page miss handler (PMH) 1268.

In an illustrative example, a TLB may be implemented as a table mapping virtual addresses to physical addresses. "TLB hit" refers to a situation when a requested virtual address is present in the TLB. "TLB miss" refers to the opposite situation: when the requested virtual address is not present in the TLB, the address translation may proceed by looking up the page table. After the physical address is determined, the virtual address to physical address mapping may be entered into the TLB.

Each TLB entry may include one or more bits indicating identifying the enclave owning the memory location referenced by the TLB entry. Alternatively, if these bits are not provided, a TLB flush will be needed when exiting the secure enclave to prevent unauthorized access to the EPC. In an illustrative example, if a TLB miss occurs, an extra lookup may fetch data from the EPC map on multiple memory references. The PMH may perform the look up of the EPC map.

Figure 13:
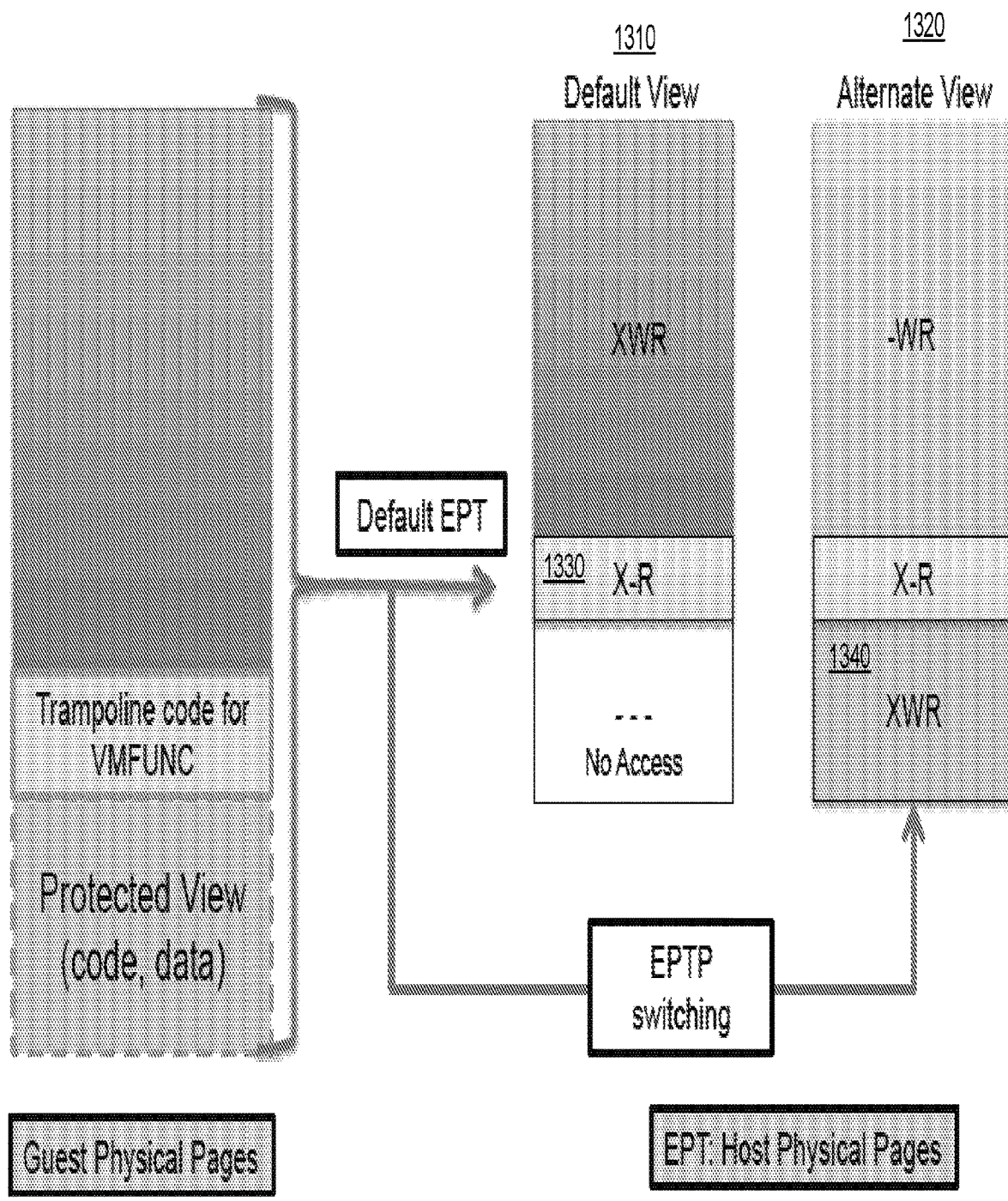
FIG. 13 schematically illustrates an example method of enabling a virtual machine to perform certain privileged operations without exiting to the VMM, in accordance with one or more aspects of the present disclosure.

FIG. 13 schematically illustrates using EPTP switching VM function (e.g., VMFUNC 0) for enabling a virtual machine to perform certain privileged operations without exiting to the VMM (e.g., to access a host memory allocated to a peer virtual machine for exit-less communications with the peer virtual machine). As schematically illustrated by FIG. 13, the VMM may create several memory views for the virtual machine, such that a first memory view ("default view" 1310) would allow the virtual machine to execute the guest code and access the guest data, while a second memory view ("alternative view" 1320) would allow the virtual machine to execute certain protected code (e.g., to access a host memory allocated to a peer virtual machine for exit-less communications with the peer virtual machine). The VMM may further create several memory pages corresponding to the above referenced views, such that each memory page would have at least an execute permission in the respective view. A first memory page 1330, which is executable from default view 1310, may comprise unprotected (i.e., guest-modifiable) guest-executable code and guest data. A second memory page 1340, which is executable from alternative view 1320, may comprise protected guest-executable code which may be employed to perform certain tasks (e.g., exit-less communication with a peer virtual machine).

The extended page-table mechanism (EPT) is a feature that can be used to support the virtualization of physical memory. When EPT is in use, certain addresses that would normally be treated as physical addresses (and used to access memory) are instead treated as guest-physical addresses. Guest-physical addresses are translated by traversing a set of EPT paging structures to produce physical addresses that are used to access memory.

EPT is used when the "enable EPT" VM-execution control is set. It translates the guest-physical addresses used in VMX non-root operation and those used by VM entry for event injection. The translation from guest-physical addresses to physical addresses is determined by a set of EPT paging structures. The EPT paging structures are similar to those used to translate linear addresses while the processor is in IA-32e mode.

Figure 14:
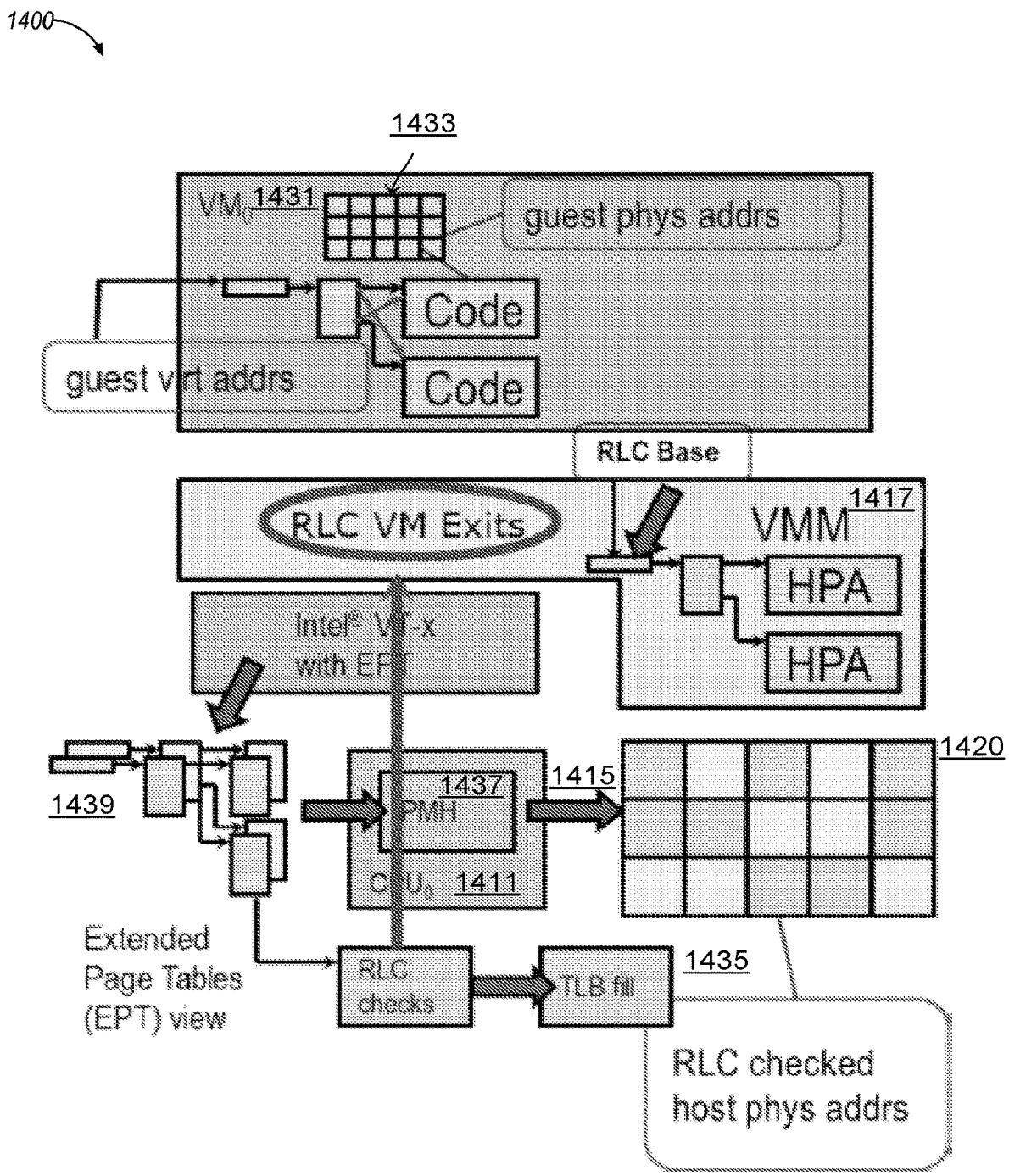
FIG. 14 schematically illustrates a block diagram of an example processing system operating in accordance with one or more aspects of the present disclosure.

FIG. 14 schematically illustrates a block diagram of an example processing system 100 operating in accordance with one or more aspects of the present disclosure. As shown in FIG. 14, processing system 1400 may comprise one or more processing cores 1411 coupled, via a shared interconnect 1415, to a memory 1420. Processing system 100 may implement a hardware-assisted virtualization mechanism allowing to execute, under control of a VMM 1417 running in the most privileged execution mode (also referred to as VMX root execution mode), one or more virtual machines in a less privileged execution mode (also referred to as VMX non-root execution mode), as described in more details herein below. In an illustrative example, a VMM may be configured to create and manage one or more virtual machines 1431 executing various software applications controlled by the respective guest operating systems. In certain implementations, processing system 1400 may also include various other components not shown in FIG. 14.

The software applications being executed by virtual machines 1431 may reference memory location using guest virtual addresses (e.g., represented by guest linear addresses in the linear address space of the respective virtual machine). Responsive to receiving a memory access request, the processor may translate the referenced guest virtual address to a guest physical address using a guest OS page table (OS PT) 1433. Processing system 100 may then further translate the guest physical address into a corresponding host physical address using an extended page table (EPT) 1439.

In certain implementations, processing system 100 may utilize a translation lookaside buffer (TLB) 1435 for caching a plurality of most recent mappings of guest virtual addresses to corresponding host physical addresses.

Figure 15:
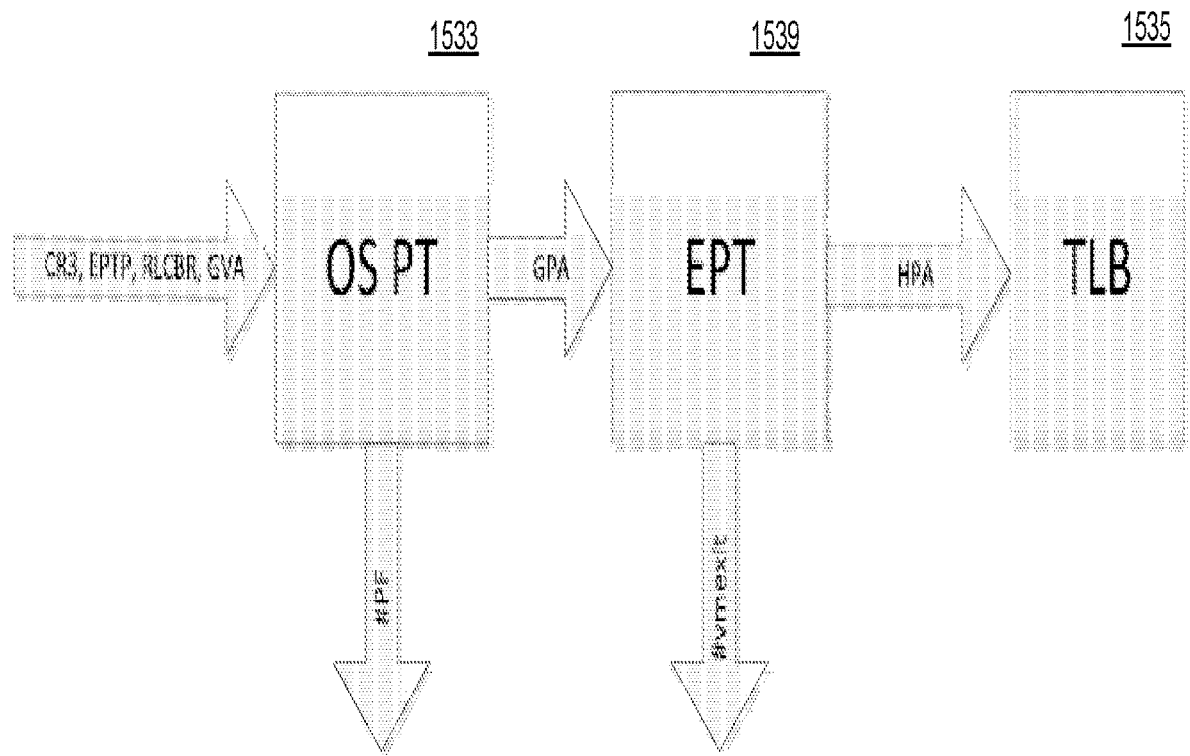
FIG. 15 schematically illustrates an example implementation of virtual address translation, in accordance with one or more aspects of the present disclosure.

FIG. 15 schematically illustrates an example implementation of virtual address translation, in accordance with one or more aspects of the present disclosure. Responsive to failing to resolve a guest virtual address using the TLB, a page miss handler (PMH) 1537 may be invoked to perform a page table walk using OS PT 1533 for translating the guest virtual address to the corresponding guest physical address and then using EPT 1539 for translating the guest physical address to the corresponding host physical address.

When the "enable EPT" VM-execution control is 1, the identity of guest-physical addresses depends on the value of CR0.PG. If CR0.PG=0, each linear address is treated as a guest-physical address. If CR0.PG=1, guest-physical addresses are those derived from the contents of control register CR3 and the guest paging structures. (This includes the values of the PDPTEs, which logical processors store in internal, non-architectural registers.) The latter includes (in page-table entries and in other paging-structure entries for which bit 7—PS—is 1) the addresses to which linear addresses are translated by the guest paging structures.

If CR0.PG=1, the translation of a linear address to a physical address requires multiple translations of guest-physical addresses using EPT. Assume, for example, that CR4.PAE=CR4.PSE=0. The translation of a 32-bit linear address then operates as follows:

Bits 31:22 of the linear address select an entry in the guest page directory located at the guest-physical address in CR3. The guest-physical address of the guest page-directory entry (PDE) is translated through EPT to determine the guest PDE's physical address.

Bits 21:12 of the linear address select an entry in the guest page table located at the guest-physical address in the guest PDE. The guest-physical address of the guest page-table entry (PTE) is translated through EPT to determine the guest PTE's physical address.

Bits 11:0 of the linear address is the offset in the page frame located at the guest-physical address in the guest PTE. The guest-physical address determined by this offset is translated through EPT to determine the physical address to which the original linear address translates.

FIG. 16 schematically illustrates example formats of paging structure entries that may be utilized by a processing system operating in accordance with one or more aspects of the present disclosure. Such paging structure entries may include page table entries referencing memory pages of various sizes, as well as page map level 4 (PML4) entry, EPT page directory pointer table entry, and page directory entry that references the EPT. In FIG. 16, "M" is an abbreviation for the maximum physical address supported by the processor (MAXPHYADDR) value, "R" indicates the read access privilege to the page referenced by the corresponding entry, "W" indicates the write access privilege to the page referenced by the corresponding entry, and "X" indicates the execute access privilege to the page referenced by the corresponding entry.

In certain implementations, a processing system operating in accordance with one or more aspects of the present disclosure supports accessed and dirty flags in ordinary paging-structure entries. Some processors also support corresponding flags in EPT paging-structure entries. For any EPT paging-structure entry that is used during guest-physical-address translation, bit 8 is the accessed flag. For an EPT paging-structure entry that maps a page (as opposed to referencing another EPT paging structure), bit 9 is the dirty flag. Whenever the processor uses an EPT paging-structure entry as part of guest-physical-address translation, it sets the accessed flag in that entry (if it is not already set). Whenever there is a write to a guest-physical address, the processor sets the dirty flag (if it is not already set) in the EPT paging-structure entry that identifies the final physical address for the guest-physical address (either an EPT PTE or an EPT paging-structure entry in which bit 7 is 1).

When accessed and dirty flags for EPT are enabled, processor accesses to guest paging-structure entries are treated as writes. Thus, such an access will cause the processor to set the dirty flag in the EPT paging-structure entry that identifies the final physical address of the guest paging-structure entry. (This does not apply to loads of the PDPTE registers for PAE paging by the MOV to CR instruction. Those loads of guest PDPTEs are treated as reads and do not cause the processor to set the dirty flag in any EPT paging-structure entry.) These flags are "sticky," meaning that, once set, the processor does not clear them; only software can clear them.

A processor may cache information from the EPT paging-structure entries in TLBs and paging-structure caches. This fact implies that, if software changes an accessed flag or a dirty flag from 1 to 0, the processor might not set the corresponding bit in memory on a subsequent access using an affected guest-physical address.

As noted herein above, in certain implementations, a processing system operating in accordance with one or more aspects of the present disclosure may accelerate the address-translation process by caching on the processor data from the structures in memory that control that process. The VPID and EPT features of the architecture for VMX operation augment this caching architecture. EPT defines the guest-physical address space and defines translations to that address space (from the linear-address space) and from that address space (to the physical-address space). Both features control the ways in which a logical processor may create and use information cached from the paging structures.

A processing system operating in accordance with one or more aspects of the present disclosure may support two kinds of translation-related information that may be cached by a logical processor: translations, which are mappings from linear page numbers to physical page frames, and paging structure caches, which map the upper bits of a linear page number to information from the paging structure entries used to translate linear addresses matching those upper bits.

The same kinds of information may be cached when VPIDs and EPT are in use. A logical processor may cache and use such information based on its function. Information with different functionality is identified as follows:

Linear mappings include linear translations (each of these is a mapping from a linear page number to the physical page frame to which it translates, along with information about access privileges and memory typing) and linear paging-structure-cache entries (each of these is a mapping from the upper portion of a linear address to the physical address of the paging structure used to translate the corresponding region of the linear-address space, along with information about access privileges. For example, bits 47:39 of a linear address would map to the address of the relevant page-directory-pointer table).

Guest-physical mappings include guest-physical translations (each of these is a mapping from a guest-physical page number to the physical page frame to which it translates, along with information about access privileges and memory typing) and guest-physical paging-structure-cache entries (each of these is a mapping from the upper portion of a guest-physical address to the physical address of the EPT paging structure used to translate the corresponding region of the guest-physical address space, along with information about access privileges).

As noted herein above, in certain implementations, a processing system operating in accordance with one or more aspects of the present disclosure may support both host and guest control of external interrupts. While guest control of external interrupts might be suitable for partitioned usages (different CPU cores/threads and I/O devices partitioned to independent virtual machines), some VMMs built upon VMX may utilize host control of external interrupts. With host control of external interrupts, the VMM (or the host OS in a hosted VMM model) manages the physical interrupt controllers in the platform and the interrupts generated through them. The VMM exposes software-emulated virtual interrupt controller devices (such as PIC and APIC) to each guest virtual machine instance.

In certain implementations, a processing system operating in accordance with one or more aspects of the present disclosure uses 8-bit vectors of which 224 (20H-FFH) are available for external interrupts. Vectors are used to select the appropriate entry in the interrupt descriptor table (IDT). VMX operation allows each guest to control its own IDT. Host vectors refer to vectors delivered by the platform to the processor during the interrupt acknowledgement cycle. Guest vectors refer to vectors programmed by a guest to select an entry in its guest IDT. Depending on the I/O resource management models supported by the VMM design, the guest vector space may or may not overlap with the underlying host vector space.

Interrupts from virtual devices: guest vector numbers for virtual interrupts delivered to guests on behalf of emulated virtual devices have no direct relation to the host vector numbers of interrupts from physical devices on which they are emulated. A guest-vector assigned for a virtual device by the guest-operating environment is saved by the VMM and utilized when injecting virtual interrupts on behalf of the virtual device.

Interrupts from assigned physical devices: hardware support for I/O device assignment allows physical I/O devices in the host platform to be assigned (direct-mapped) to VMs. Guest vectors for interrupts from direct-mapped physical devices take up equivalent space from the host vector space, and require the VMM to perform host-vector to guest-vector mapping for interrupts.

Figure 17:
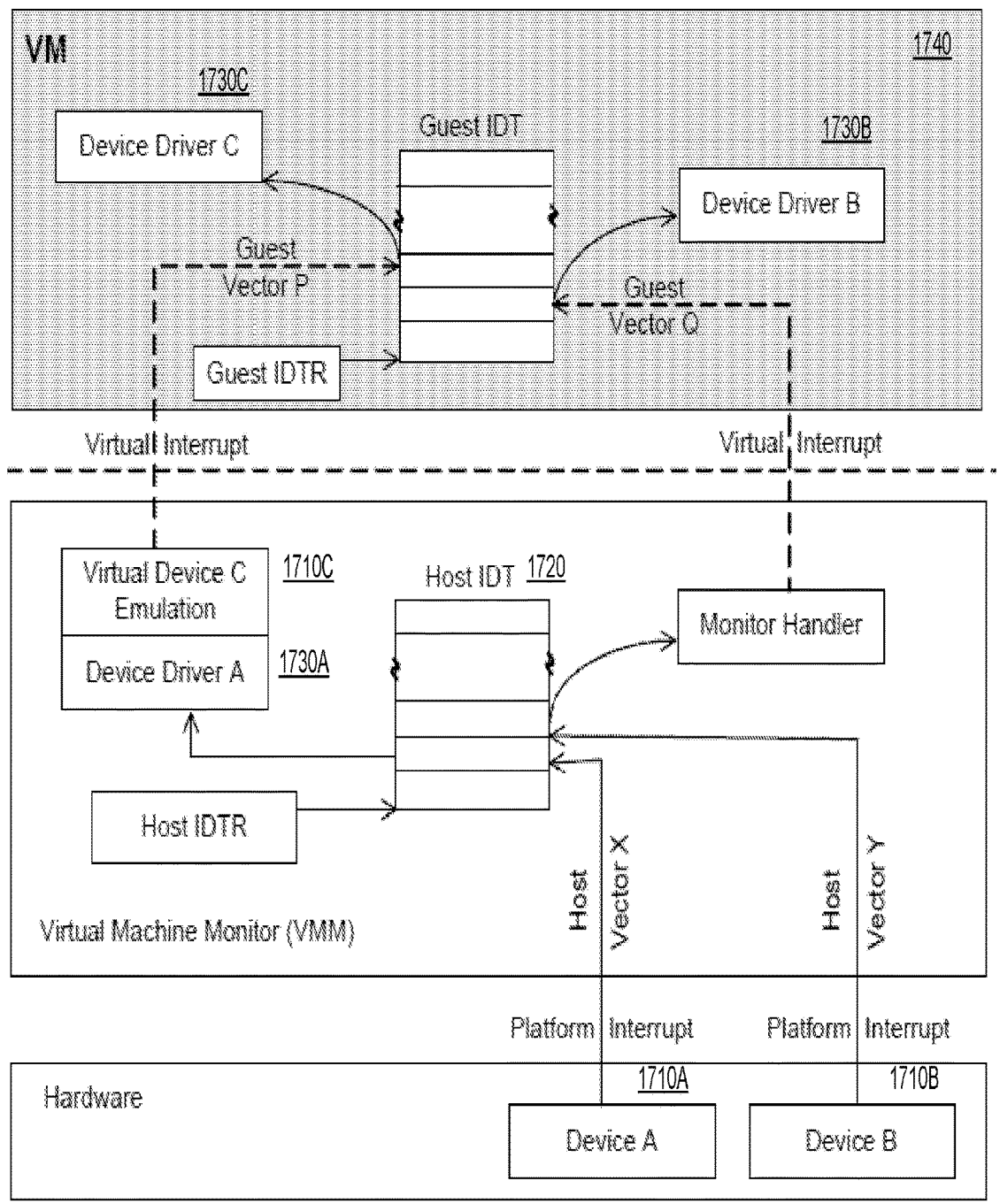
FIG. 17 schematically illustrates an example functional relationship between host external interrupts and guest virtual external interrupts implemented by a processing system operating in accordance with one or more aspects of the present disclosure.

FIG. 17 schematically illustrates an example functional relationship between host external interrupts and guest virtual external interrupts implemented by a processing system operating in accordance with one or more aspects of the present disclosure. In the illustrative example of FIG. 17, device 1710A is owned by the host and generates external interrupts with host vector X. The host IDT 1720 is set up such that the interrupt service routine (ISR) for device driver 1730A is hooked to host vector X as normal. VMM emulates (over device 1710A) virtual device 1710C in software which generates virtual interrupts to the VM with guest expected vector P. Device 1710B is assigned to a VM 1740 and generates external interrupts with host vector Y. The host IDT 1720 is programmed to hook the VMM interrupt service routine (ISR) for assigned devices for vector Y, and the VMM handler injects virtual interrupt with guest vector Q to the VM 1740. The guest operating system programs the guest to hook appropriate guest driver's ISR to vectors P and Q.

To perform the interrupt virtualization, the VMM may take ownership of the physical interrupts and the various interrupt controllers in the platform. VMM control of physical interrupts may be enabled through the host-control settings of the "external-interrupt exiting" VM-execution control. To take ownership of the platform interrupt controllers, the VMM may expose the virtual interrupt controller devices to the virtual machines and restrict guest access to the platform interrupt controllers.

In certain implementations, a processing system operating in accordance with one or more aspects of the present disclosure may support one or more of the following types of external interrupt control mechanisms: Programmable Interrupt Controllers (PIC), Advanced Programmable Interrupt Controllers (APIC), and Message Signaled Interrupts (MSI).

A PIC-enabled platform implementation may support dual 8259 interrupt controllers cascaded as master and slave controllers. They may support up to 15 possible interrupt inputs. The 8259 controllers are programmed through initialization command words (ICWx) and operation command words (OCWx) accessed through specific I/O ports. The various interrupt line states are captured in the PIC through interrupt requests, interrupt service routines and interrupt mask registers. Guest access to the PIC I/O ports can be restricted by activating I/O bitmaps in the guest controlling-VMCS (activate-I/O-bitmap bit in VM-execution control field set to 1) and pointing the I/O-bitmap physical addresses to valid bitmap regions. Bits corresponding to the PIC I/O ports can be cleared to cause a VM exit on guest access to these ports.

If the VMM does not support the direct access to any I/O ports from a guest, it can set the unconditional-I/O-exiting in the VM-execution control field instead of activating I/O bitmaps. The exit-reason field in VM-exit information allows identification of VM exits due to I/O access and can provide an exit-qualification to identify details about the guest I/O operation that caused the VM exit.

In various illustrative examples, the VMM PIC virtualization may emulate the platform PIC functionality including interrupt priority, mask, request and service states, and specific guest programmed modes of PIC operation.

While the standard PIC is intended for use on uniprocessor systems, APIC can be used in either uniprocessor or multi-processor systems. APIC-based interrupt control comprises two physical components: the interrupt acceptance unit (Local APIC) which is integrated with the processor, and the interrupt delivery unit (I/O APIC) which is part of the I/O subsystem. APIC virtualization involves protecting the platform's local and I/O APICs and emulating them for the guest.

The local APIC is responsible for the local interrupt sources, interrupt acceptance, dispensing interrupts to the logical processor, and generating inter-processor interrupts. Software interacts with the local APIC by reading and writing its memory-mapped registers residing within a 4-KByte uncached memory region with base address stored in the IA32_APIC_BASE MSR. Since the local APIC registers are memory-mapped, the VMM can utilize memory virtualization techniques (such as page-table virtualization) to trap guest accesses to the page frame hosting the virtual local APIC registers.

Local APIC virtualization in the VMM may emulate the various local APIC operations and registers, such as: APIC identification/format registers, the local vector table (LVT), the interrupt command register (ICR), interrupt capture registers (TMR, IRR and ISR), task and processor priority registers (TPR, PPR), the EOI register and the APIC-timer register. Since local APICs are designed to operate with non-specific EOI, local APIC emulation also may emulate broadcast of EOI to the guest's virtual I/O APICs for level triggered virtual interrupts.

A local APIC allows interrupt masking at two levels: mask bit in the local vector table entry for local interrupts and raising processor priority through the TPR registers for masking lower priority external interrupts. The VMM may comprehend these virtual local APIC mask settings as programmed by the guest in addition to the guest virtual processor interruptibility state (when injecting APIC routed external virtual interrupts to a guest VM).

VMX provides several features which help the VMM to virtualize the local APIC. These following features allow many of guest TPR accesses (using CR8 only) to occur without VM exits to the VMM:

The VMCS contains a "virtual-APIC address" field. This 64-bit field is the physical address of the 4-KByte virtual APIC page (4-KByte aligned). The virtual-APIC page contains a TPR shadow, which is accessed by the MOV CR8 instruction. The TPR shadow comprises bits 7:4 in byte 80H of the virtual-APIC page.

The TPR threshold: bits 3:0 of this 32-bit field determine the threshold below which the TPR shadow cannot fall. A VM exit will occur after an execution of MOV CR8 that reduces the TPR shadow below this value.

The processor-based VM-execution controls field contains a "use TPR shadow" bit and a "CR8-store exiting" bit. If the "use TPR shadow" VM-execution control is 1 and the "CR8-store exiting" VM-execution control is 0, then a MOV from CR8 reads from the TPR shadow. If the "CR8-store exiting" VM-execution control is 1, then MOV from CR8 causes a VM exit; the "use TPR shadow" VM-execution control is ignored in this case.

The processor-based VM-execution controls field contains a "CR8-load exiting" bit. If the "use TPR shadow" VM-execution control is set and the "CR8-load exiting" VM-execution control is clear, then MOV to CR8 writes to the "TPR shadow". A VM exit will occur after this write if the value written is below the TPR threshold. If the "CR8-load exiting" VM-execution control is set, then MOV to CR8 causes a VM exit; the "use TPR shadow" VMexecution control is ignored in this case.

As noted herein above, in certain implementations, a processing system operating in accordance with one or more aspects of the present disclosure may support I/O APIC virtualization. The I/O APIC registers may be mapped to a 1 MByte region where each I/O APIC is allocated a 4K address window within this range. The VMM may utilize physical memory virtualization to trap guest accesses to the virtual I/O APIC memory-mapped registers. The I/O APIC virtualization may emulate the various I/O APIC operations and registers such as identification/version registers, indirect-I/O-access registers, EOI register, and the I/O redirection table. I/O APIC virtualization also may emulate various redirection table entry settings such as delivery mode, destination mode, delivery status, polarity, masking, and trigger mode programmed by the guest and track remote-IRR state on guest EOI writes to various virtual local APICs.

As noted herein above, in certain implementations, a processing system operating in accordance with one or more aspects of the present disclosure may support Message Signaled Interrupts (MSI) virtualization.

The PCI Local Bus Specification (Rev. 2.2) introduces the concept of message signaled interrupts (MSI). MSI enable PCI devices to request service by writing a system-specified message to a system specified address. The transaction address specifies the message destination while the transaction data specifies the interrupt vector, trigger mode and delivery mode. System software is expected to configure the message data and address during MSI device configuration, allocating one or more no-shared messages to MSI capable devices. While MSI is optional for conventional PCI devices, it is the preferred interrupt mechanism for PCI-Express devices.

Since the MSI address and data are configured through PCI configuration space, to control these physical interrupts the VMM may assume ownership of PCI configuration space. This allows the VMM to capture the guest configuration of message address and data for MSI-capable virtual and assigned guest devices. PCI configuration transactions on PC-compatible systems are generated by software through the standard CONFIG_ADDRESS/CONFIG_DATA register mechanism (CFCH/CF8H ports) as defined in the PCI Local Bus Specification or the enhanced flat memory-mapped (MEMCFG) configuration mechanism as defined in the PCI-Express Base Specification (Rev. 1.0a.).

In an illustrative example, for host-owned I/O devices, the interrupting device is owned by the VMM (or hosting OS in a hosted VMM). In this model, the interrupt service routine in the VMM/host driver is invoked and, upon ISR completion, the appropriate write sequences (TPR updates, EOI etc.) to respective interrupt controllers are performed as normal. If the work completion indicated by the driver implies virtual device activity, the VMM runs the virtual device emulation. Depending on the device class, physical device activity could imply activity by multiple virtual devices mapped over the device. For each affected virtual device, the VMM injects a virtual external interrupt event to respective guest virtual machines. The guest driver interacts with the emulated virtual device to process the virtual interrupt. The interrupt controller emulation in the VMM supports various guest accesses to the VMM's virtual interrupt controller.

In another illustrative example, for guest-assigned I/O Devices, either the VMM uses a software proxy or it can directly map the physical device to the assigned VM. In both cases, servicing of the interrupt condition on the physical device is initiated by the driver running inside the guest VM. With host control of external interrupts, interrupts from assigned physical devices because VM exits to the VMM and vectoring through the host IDT to the registered VMM interrupt handler. To unblock delivery of other low priority platform interrupts, the VMM interrupt handler may mask the interrupt source (for level triggered interrupts) and issue the appropriate EOI write sequences.

As noted herein above, in certain implementations, a processing system operating in accordance with one or more aspects of the present disclosure may support various methods of memory virtualization. The VMM controls physical memory to ensure VM isolation and to remap guest physical addresses in host physical address space for virtualization. Memory virtualization allows the VMM to enforce control of physical memory and yet support guest OSs' expectation to manage memory address translation.

Memory virtualization may facilitate guest execution in various processor operating modes. This includes: protected mode with paging, protected mode with no paging, real-mode and any other transient execution modes. VMX allows guest operation in protected-mode with paging enabled and in virtual-8086 mode (with paging enabled) to support guest real-mode execution. Guest execution in transient operating modes (such as in real mode with one or more segment limits greater than 64-KByte) may be emulated by the VMM.

Since VMX operation involves processor execution in protected mode with paging (through CR0 and CR4 fixed bits), the VMM may utilize paging structures to support memory virtualization. To support guest real-mode execution, the VMM may establish a simple flat page table for guest linear to host physical address mapping. Memory virtualization algorithms may also capture other guest operating conditions (such as guest performing A20M # address masking) to map the resulting 20-bit effective guest physical addresses.

Memory virtualization provides guest software with contiguous guest physical address space starting zero and extending to the maximum address supported by the guest virtual processor's physical address width. The VMM utilizes guest physical to host physical address mapping to locate all or portions of the guest physical address space in host memory. The VMM is responsible for the policies and algorithms for this mapping that may take into account the host system physical memory map and the virtualized physical memory map exposed to a guest by the VMM. The memory virtualization algorithm needs to accommodate various guest memory uses (such as: accessing DRAM, accessing memory-mapped registers of virtual devices or core logic functions and so forth).

In an illustrative example, to support guest DRAM access, the VMM needs to map DRAM-backed guest physical addresses to host-DRAM regions. The VMM also requires the guest to host memory mapping to be at page granularity.

In another illustrative example, virtual devices (I/O devices or platform core logic) emulated by the VMM may claim specific regions in the guest physical address space to locate memory-mapped registers. Guest access to these virtual registers may be configured to cause page-fault induced VM-exits by marking these regions as always not present. The VMM may handle these VM exits by invoking appropriate virtual device emulation code.

In certain implementations, guest software may be allowed to freely modify the guest page-table hierarchy without causing traps to the VMM. Because of this, the active page-table hierarchy might not always be consistent with the guest hierarchy. To allow the guest software to freely access page directories and page tables, traps may be set to occur on CR3 accesses and executions of INVLPG. They also occur when necessary to ensure that guest modifications to the translation structures actually take effect. The software mechanisms to support this approach are collectively called virtual TLB, since they emulate the functionality of the processor's physical TLB.

While the page-table hierarchy defines the relationship between physical to linear address, it does not directly control the address translation of each memory access. Instead, the translation may be controlled by the TLB, which is occasionally filled by the processor with translations derived from the page-table hierarchy. With a virtual TLB, the page-table hierarchy established by the guest software (specifically, the guest operating system) does not control translation, either directly or indirectly. Instead, the translation is controlled by the processor (through the TLB) and by the VMM (through a page-table hierarchy that it maintains).

In an illustrative example, the VMM may maintain an alternative page-table hierarchy that effectively caches translations derived from the hierarchy maintained by guest software. The former may be referred to as the active page-table hierarchy (because it is referenced by CR3 and may be used by the processor to load its TLB), and the latter may be referred to as the guest page-table hierarchy (because it is maintained by guest software). The entries in the active hierarchy may resemble the corresponding entries in the guest hierarchy in some ways and may differ in others.

Figure 18:
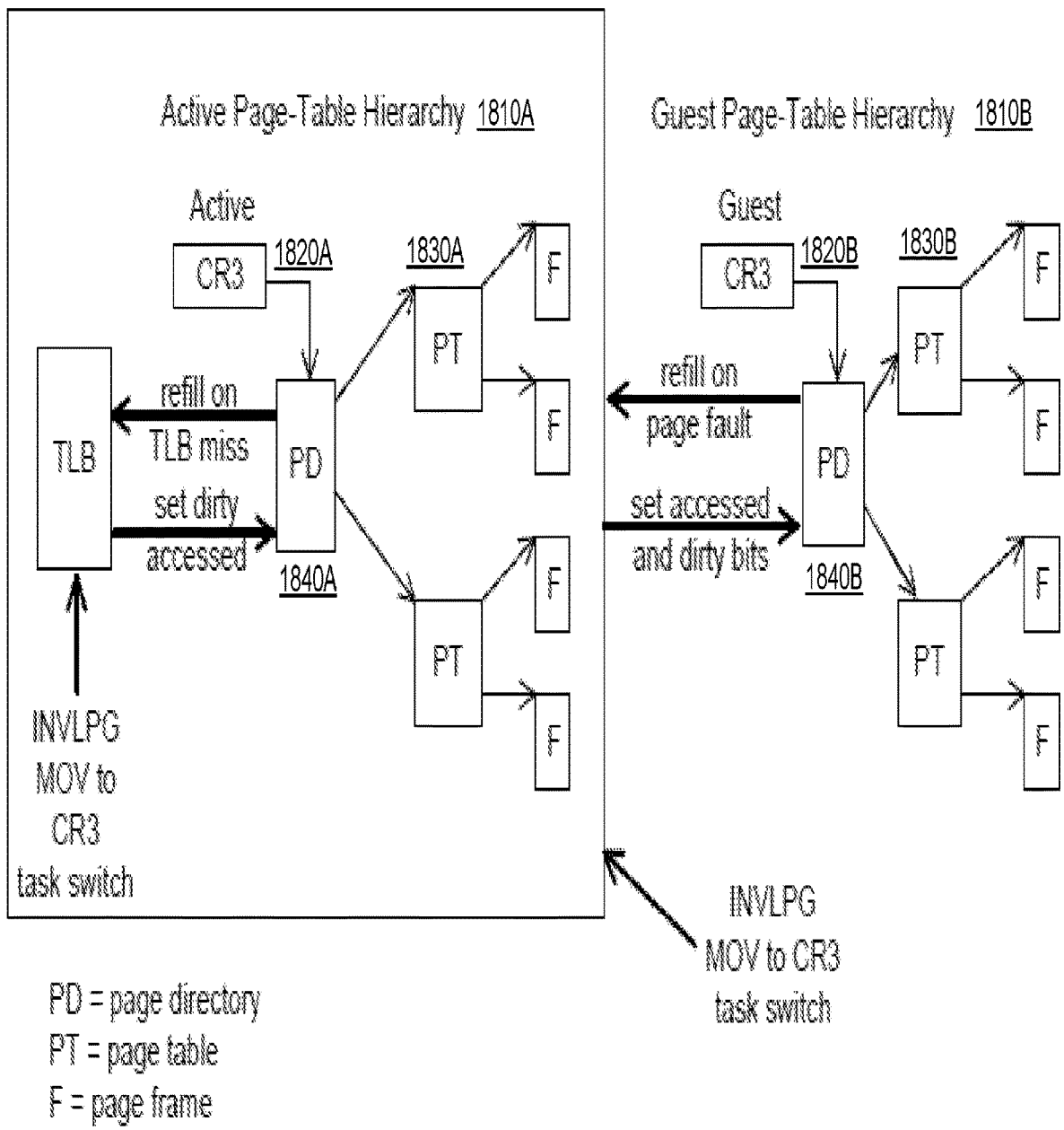
FIG. 18 schematically illustrates an example method of implementing memory virtualization using a virtual TLB, in accordance with one or more aspects of the present disclosure.

FIG. 18 schematically illustrates an example method of implementing memory virtualization using a virtual TLB, in accordance with one or more aspects of the present disclosure. As noted herein above, the VMM maintains an active page-table hierarchy 1810A for each virtual machine that it supports. It also maintains, for each machine, values that the machine expects for control registers CR0, CR2, CR3, and CR4 (they control address translation). These values are called the guest control registers. In general, the VMM selects the physical-address space that is allocated to guest software. The term "guest address" refers to an address installed by guest software in the guest CR3 1820B, in a guest page directory 1830B (as a page table base address or a page base address), or in a guest page table 1840B (as a page base address). While guest software considers these to be specific physical addresses, the VMM may map them differently. When guest software first enables paging, the VMM creates an aligned 4-KByte active page directory that is invalid (all entries marked not present). This invalid directory is analogous to an empty TLB.

Page faults can occur for a variety of reasons. In some cases, the page fault alerts the VMM to an inconsistency between the active page-table hierarchy 1810A and guest page-table hierarchy 1810B. In such cases, the VMM can update the active page-table hierarchy 1810A and re-execute the faulting instruction. In other cases, the hierarchies are already consistent and the fault should be handled by the guest operating system. The VMM can detect this and use an established mechanism for raising a page fault to guest software.

While the present disclosure has been described with respect to a limited number of example implementations, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of example implementations of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one example implementation, refers to the hardware, which is specifically configured to recognize and/or execute the code to be held on a non-transitory medium. Furthermore, in another example implementation, use of a module refers to the non-transitory medium including the code, which is specifically adapted to be executed by the microcontroller to perform predetermined operations. And as can be inferred, in yet another example implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one example implementation, use of the term logic includes hardware, such as transistors, registers, or other hardware, such as programmable logic devices.

Use of the phrase 'configured to,' in one example implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one example implementation, refers to some apparatus, logic, hardware, and/or element designed in such a way to enable use of the apparatus, logic, hardware, and/or element in a specified manner. Note as above that use of to, capable to, or operable to, in one example implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one example implementation, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one example implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The example implementations of methods, hardware, software, firmware or code set forth above may be implemented via instructions or code stored on a machine-accessible, machine readable, computer accessible, or computer readable medium that are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform example implementations of the present disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one example implementation" or "an example implementation" means that a particular feature, structure, or characteristic described in connection with the example implementation is included in at least one example implementation of the present disclosure. Thus, the appearances of the phrases "in one example implementation" or "in an example implementation" in various places throughout this specification are not necessarily all referring to the same example implementation. Furthermore, the particular features, structures, or characteristics may be combined in any suitable manner in one or more example implementations.

In the foregoing specification, a detailed description has been given with reference to specific exemplary example implementations. It will, however, be evident that various modifications and changes may be made thereto without departing from the broader spirit and scope of the present disclosure as set forth in the appended claims. The specification and drawings are, accordingly, to be regarded in an illustrative sense rather than a restrictive sense. Furthermore, the foregoing use of example implementation and other exemplarily language does not necessarily refer to the same example implementation or the same example, but may refer to different and distinct example implementations, as well as potentially the same example implementation.

What is claimed is:

1. A processing device comprising:
   a processor core; and
   a memory controller coupled between the processor core and a memory, wherein the processor core is to perform the following:
   receiving a resume instruction from a first virtual machine monitor (VMM) that operates in a non-root mode, and
   responsively performing operations, comprising:
   setting data fields for a first virtual machine control structure (VMCS) of a second VMM that operates in a root mode;
   setting, by the second VMM, a virtual machine (VM) exit field of the first VMCS;
   executing, by the second VMM, the resume instruction;
   verifying that data associated with the resume instruction is valid;
   verifying, in response to the data associated with the resume instruction being valid, a validity of the VM exit field; and
   transferring, in response to the VM exit field being valid, a control of a resource from the first VMM to a VM managed by the first VMM.

2. The processing device of claim 1, wherein:
   the first VMCS comprises a guest field, a host field, control fields, a VM entry field, and a VM exit field; and
   the control fields comprises a VMCS link pointer, a state VMCS link pointer, a control VMCS link pointer, a reason bitmap, and an exception bitmap.

3. The processing device of claim 2, wherein to set the data fields the processor core is further to:
   copy, to the guest field of the first VMCS, data from a guest field of a second VMCS;
   copy, to the host field of the first VMCS, data from a host field of a third VMCS;
   merge data from the control fields of the second VMCS and the third VMCS;
   copy the merged data to the control fields of the first VMCS; and
   copy, to the VM entry field of the first VMCS, data from a VM entry field of the second VMCS.

4. The processing device of claim 1, wherein to set the VM exit field the processor core is further to set the VM exit field with a control VMCS link pointer with an address of a second VMCS, and a state VMCS link pointer with the address of a third VMCS.

5. The processing device of claim 1, wherein to set the VM exit field the processor core is further to set the VM exit field with a control VMCS link pointer with an address of a second VMCS, a state VMCS link pointer with the address of a third VMCS, and a reason bitmap.

6. The processing device of claim 1, wherein the processor core is to maintain the control of the resource at the first VMM in response to at least one of:

data associated with the resume instruction being invalid; or the VM exit field being invalid.

7. The processing device of claim 1, wherein the VM operates in the non-root mode.

8. A method comprising:

receiving a resume instruction from a first virtual machine monitor (VMM) that operates in a non-root mode; and responsively performing operations, comprising:

setting data fields for a first virtual machine control structure (VMCS) of a second VMM that operates in a root mode;

setting, by the second VMM, a virtual machine (VM) exit field of the first VMCS;

executing, by the second VMM, the resume instruction;

verifying that data associated with the resume instruction is valid;

verifying, in response to the data associated with the resume instruction being valid, a validity of the VM exit field; and transferring, in response to the VM exit field being valid, a control of a resource from the first VMM to a VM managed by the first VMM.

9. The method of claim 8, wherein the setting the data fields comprises setting, by the second VMM, the data fields for the first VMCS of the second VMM, and wherein the setting the VM exit field of the first VMCS comprises setting, by the second VMM, the VM exit field of the first VMCS.

10. The method of claim 8, wherein the verifying the validity of the VM exit field is performed in response to the data associated with the resume instruction being valid, and wherein the transferring the control of the resource from the first VMM to the VM is performed in response to the VM exit field being valid.

11. The method of claim 8, wherein the setting the data fields for the first VMCS of the second VMM comprises setting a guest field, a host field, control fields, a VM entry field, and a VM exit field of the first VMCS, wherein the control fields comprises: a VMCS link pointer; a state VMCS link pointer; a control VMCS link pointer; a reason bitmap; and an exception bitmap.

12. The method of claim 11, wherein the setting the data fields for the first VMCS of the second VMM comprises:

copying, to the guest field of the first VMCS, data from a guest field of a second VMCS;

copying, to the host field of the first VMCS, data from a host field of a third VMCS;

merging data from the control fields of the second VMCS and the third VMCS;

copying the merged data to the control fields of the first VMCS; and copying, to the VM entry field of the first VMCS, data from a VM entry field of the second VMCS.

13. The method of claim 8, wherein the setting the VM exit field of the first VMCS comprises setting the VM exit field with a control VMCS link pointer with an address of a second VMCS, a state VMCS link pointer with the address of a third VMCS, and a reason bitmap.

14. The method of claim 8, further comprising maintaining the control of the resource at the first VMM in response to at least one of:

data associated with the resume instruction being invalid; or the VM exit field being invalid.

15. The method of claim 8, further comprising:

operating the VM in the non-root mode.

16. A system comprising:

a processor; and a memory device coupled to the processor, wherein the processor is to perform the following receiving a resume instruction from a first virtual machine monitor (VMM) that operates in a non-root mode; and responsively performing operations, comprising:

setting data fields for a first virtual machine control structure (VMCS) of the second VMM that operates in a root mode;

setting, by the second VMM, a virtual machine (VM) exit field of the first VMCS;

executing, by the second VMM, the resume instruction verifying that data associated with the resume instruction is valid;

verifying, in response to the data associated with the resume instruction being valid, a validity of the VM exit field; and transferring, in response to the VM exit field being valid, a control of a resource from the first VMM to the VM managed by the first VMM.

17. The system of claim 16, wherein:

the first VMCS comprises a guest field, a host field, control fields, a VM entry field, and a VM exit field; and the control fields comprises, a VMCS link pointer, a state VMCS link pointer, a control VMCS link pointer, a reason bitmap, and an exception bitmap.

18. The system of claim 17, wherein to set the data fields the processor is further to:

copy, to the guest field of the first VMCS, data from a guest field of a second VMCS;

copy, to the host field of the first VMCS, data from a host field of a third VMCS;

merge data from the control fields of the second VMCS and the third VMCS;

copy the merged data to the control fields of the first VMCS; and copy, to the VM entry field of the first VMCS, data from a VM entry field of the second VMCS.

19. The system of claim 16, wherein to set the VM exit field the processor is further to set the VM exit field with a control VMCS link pointer with an address of a second VMCS, a state VMCS link pointer with the address of a third VMCS, and a reason bitmap.

20. The system of claim 16, wherein the processor is to maintain the control of the resource at the first VMM in response to at least one of:

data associated with the resume instruction being invalid; or the VM exit field being invalid.

* * * * *